United States Patent [19]

Yagasaki et al.

[11] Patent Number: 5,136,376
[45] Date of Patent: Aug. 4, 1992

[54] METHOD OF CODING VIDEO SIGNALS AND TRANSMISSION SYSTEM THEREOF

[75] Inventors: Yoichi Yagasaki; Jun Yonemitsu, both of Kanagawa, Japan

[73] Assignee: Sony Corporation, Tokyo, Japan

[21] Appl. No.: 596,250

[22] Filed: Oct. 12, 1990

[30] Foreign Application Priority Data

Oct. 14, 1989 [JP] Japan .................... 1-267049

[51] Int. Cl.$^5$ .................. H04N 7/12; H04N 7/13
[52] U.S. Cl. .................... 358/133; 358/135; 358/136
[58] Field of Search ............ 358/136, 135, 133, 141, 358/12

[56] References Cited

U.S. PATENT DOCUMENTS

| | | | |
|---|---|---|---|
| 4,562,468 | 12/1985 | Koga | 358/136 |
| 4,672,441 | 6/1987 | Hoelzlwimmer et al. | 358/136 |
| 4,757,383 | 7/1988 | Tanaka | 358/133 |
| 4,851,906 | 7/1989 | Koga et al. | 358/136 |
| 4,894,713 | 1/1990 | Delogne et al. | 358/136 |
| 4,897,855 | 1/1990 | Acampora | 358/136 |
| 4,931,869 | 6/1990 | Amor et al. | 358/136 |
| 4,954,892 | 9/1990 | Asai et al. | 358/136 |
| 4,972,260 | 11/1990 | Fujikawa et al. | 358/136 |
| 4,984,076 | 1/1991 | Watanabe et al. | 358/133 |
| 5,038,209 | 8/1991 | Hang | 358/135 |

Primary Examiner—James J. Groody
Assistant Examiner—Michael H. Lee
Attorney, Agent, or Firm—Alvin Sinderbrand; William S. Frommer

[57] ABSTRACT

In a video signal coding method for generating transmission data, a digital video signal is quantized by a quantization step which is controlled on the basis of significant picture information to be transmitted. The significant picture information is, for example, the quantity of information in a main region and in a sub region, the quantity of picture information to be coded, the picture motion in coded regions, the amount of variations in picture information between regions to be coded, or the components of spatial frequency with respect to regions to be coded. By reason of such control of the quantization step, deterioration of picture quality of the transmission data can be avoided, while the quantity of transmitted data is reduced.

13 Claims, 22 Drawing Sheets

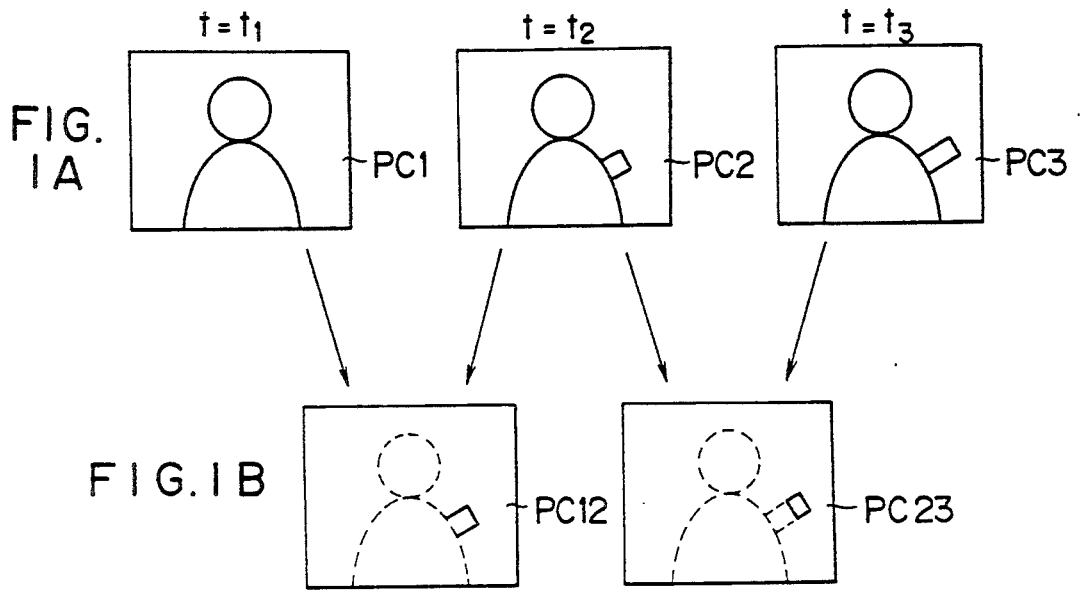
FIG. 1A
FIG. 1B
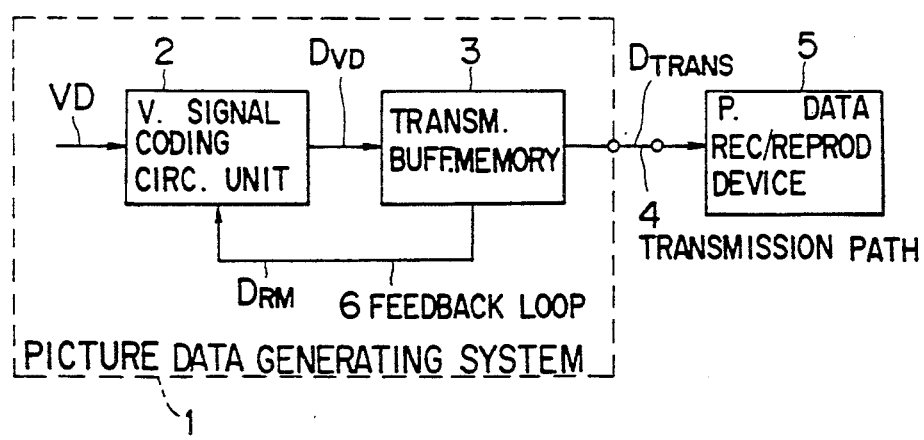
FIG. 2 (PRIOR ART)

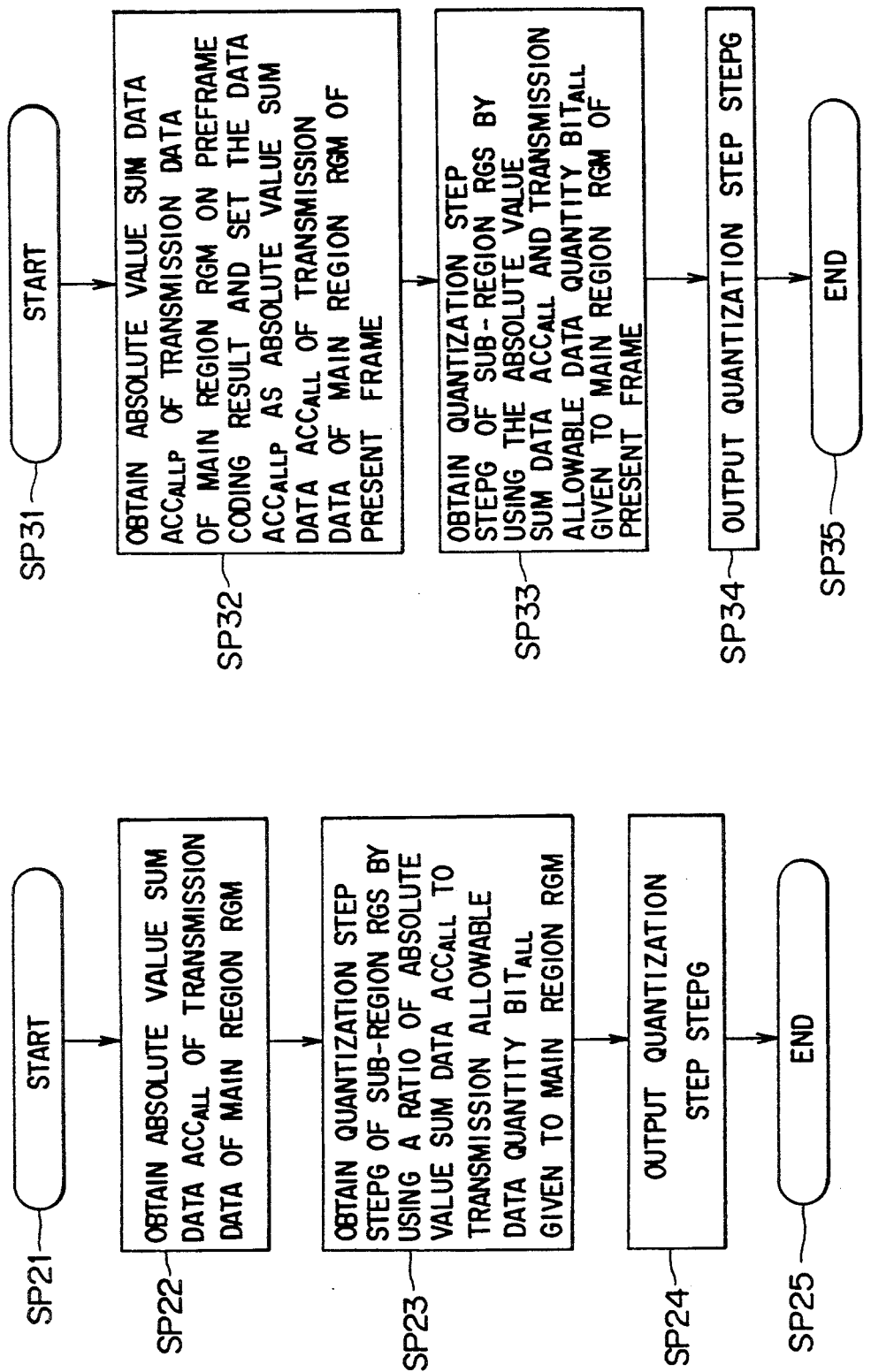

(A)      (B)      (C)

| H V | 1 | 2 | 3 | 4 | 5 | 6 | 7 | 8 |
|---|---|---|---|---|---|---|---|---|
| 1 | 1.000 | 1.000 | 1.000 | 1.000 | 1.000 | 1.000 | 1.000 | 1.000 |
| 2 | 1.000 | 0.990 | 0.980 | 0.969 | 0.959 | 0.949 | 0.939 | 0.929 |
| 3 | 1.000 | 0.980 | 0.959 | 0.939 | 0.918 | 0.898 | 0.878 | 0.857 |
| 4 | 1.000 | 0.969 | 0.939 | 0.908 | 0.878 | 0.847 | 0.816 | 0.786 |
| 5 | 1.000 | 0.959 | 0.918 | 0.878 | 0.837 | 0.796 | 0.755 | 0.714 |
| 6 | 1.000 | 0.949 | 0.898 | 0.847 | 0.795 | 0.745 | 0.694 | 0.643 |
| 7 | 1.000 | 0.939 | 0.878 | 0.816 | 0.755 | 0.694 | 0.633 | 0.571 |
| 8 | 1.000 | 0.929 | 0.857 | 0.786 | 0.714 | 0.643 | 0.571 | 0.500 |

METHOD OF CODING VIDEO SIGNALS AND TRANSMISSION SYSTEM THEREOF

BACKGROUND OF THE INVENTION

1. Field of the Invention

The present invention relates to a method of coding video signals, and more particularly, to a video signal coding method by which digital video signals are transformed into highly-efficiently-coded data which can be recorded with enhancement of the picture quality by a disk recorder.

2. Description of the Prior Art

A video signal recording system has been proposed in which intra- and inter-frame coded data obtained by highly-efficient-coding of video signals representing motion pictures are recorded on a recording medium, such as, a CD (compact disc), so as to be readily searched.

Highly-efficient coding is attained as follows:

By way of example, as illustrated in FIG. 1(A), motion pictures PC1, PC2, PC3, . . . are digitally-coded at times t=t1, t2, t3, . . . When being transmitted to a transmission system, for example, constituted by a CD recording system, transmission efficiency is enhanced by compressing the digital data to be transmitted while making use of the substantial autocorrelativity of the video signals.

More specifically, in effecting an intra-frame coding process in respect to the pictures PC1, PC2, PC3, . . . , arithmetic processing is performed to obtain the difference between one-dimensionally or two-dimensionally adjacent picture data along, for instance, a horizontal scanning line. Subsequently, the compressed bit-number picture data of the respective pictures PC1, PC2, PC3 . . . are transmitted.

For carrying out an inter-frame coding process, picture data PC12, PC23, . . . , for example, as shown in FIG. 1(B), and which consist of differences in pixel data between the adjacent pictures PC1, PC2 and between the adjacent pictures PC2, PC3, . . . , respectively, are sequentially obtained. The resulting picture data are transmitted, together with the intra-frame-coded picture data corresponding to the initial picture PC1, at the timing t=t1.

Thus, it is possible to supply, to the transmission system, video signals which have been highly-efficiently-coded so as to obtain digital data having a remarkably smaller number of bits than would be required for transmission of all of the pixel data of the pictures PC1, PC2, PC3, . . .

The above previously proposed video signal coding process may be executed by a picture data generating device 1 constructed as shown in FIG. 2, in which the incoming video signal VD is quantized to highly-efficiently-coded data $D_{VD}$ in a video signal coding circuit 2. The data $D_{VD}$ is temporarily stored in a transmission buffer memory 3 and is read therefrom as transmission data $D_{TRANS}$ at a predetermined transmitting velocity. The transmission data $D_{TRANS}$ is transmitted through a transmission path or route 4 to a picture data recording-/reproducing device 5 which may be, for example, a CD recording/reproducing device. The transmission buffer memory 3 transmits the transmission data $D_{TRANS}$ at a transmitting velocity determined by the transmission capacity of the transmission path 4 leading to the picture data recording/reproducing device 5. Simultaneously, the transmission buffer memory 3 feeds back a remaining quantity data signal $D_{RM}$ through a feedback loop 6 to the video signal coding circuit 2. Such signal $D_{RM}$ indicates the quantity of data remaining in the memory 3. As a result of such feedback, the video signal coding circuit 2 controls the quantity of the highly-efficiently-coded data $D_{VD}$ supplied to the transmission buffer memory 3 by controlling a quantization step STEPG (FIG. 3) employed in digitally-coding the video signal VD. The data held in the memory 3 are thereby controlled so as to avoid an overflow or underflow.

The video signal coding circuit 2 of the known picture generating device 1 may, as shown specifically in FIG. 4, include a preprocessor 11 which receives the video signals VD and transforms a luminance signal and a chroma signal contained therein into digital data. Then, the preprocessor 11 executes a one-side field removing process and a one-side field line cull-out process so as to transform the digital data into motion picture data. The motion picture data is then transformed into transmission unit block data S11 with each block consisting of 16 pixels in the horizontal or line direction×16 lines of data. The resulting transformed data S11 are accumulated in a present frame memory 12 to provide present frame data S12 which is supplied to a subtractor circuit 13 as an addition input. Preframe data S13 obtained from a preframe memory 14 are also applied to the subtractor circuit 13 for subtraction in the latter from the present frame data S12. Thus, the difference or deviation data S14 obtained at an output terminal of the subtractor circuit 13 corresponds to the deviation between the transmission unit block data of the present frame picture data and the transmission unit block data of the preframe picture data. Such deviation data S14 is transformed into transform coding data S15 by means of a transform coding circuit 15 which, for example, may be constituted by a discrete cosine transform circuit. The data S15 is thereafter quantized in a quantization circuit 16.

Quantization data S16 obtained from the quantization circuit 16 is highly-efficiently-coded once again in a variable-length coding circuit 17. The resulting variable length coding data S17 is composited with pieces of first and second management information S18 and S19 in a composition circuit 18. The composite data is supplied, as transmission picture data S20, from the composition circuit 18 to the transmission buffer memory 3.

Additionally, the quantization data S16 is inverse-transformed by means of an inverse transform circuit 19 which includes an inverse quantization circuit and an inverse transform coding circuit (not shown). The inverse-transformed data S21 are accumulated as decoding deviation data in the preframe memory 14 via an adder circuit 20. The present frame picture data sent to the transmission buffer memory 3 are accumulated, as the preframe picture data, in the preframe memory 14.

On the other hand, a motion compensating circuit 21 is supplied with the present frame data S12 from the present frame memory 12 together with preframe data S22 from the preframe memory 14. Motion vector data S23 is formed by circuit 23 for indicating motion appearing from the preframe picture data in respect to the present frame picture data. The motion vector data S23 is supplied to the preframe memory 14 and is also supplied, as the first management information S18, to the composition circuit 18. As a consequence of the foregoing, the motion vector data S23 is transmitted to the transmission buffer memory 3 as part of the header information of the data corresponding to the deviation data S14.

The variable-length coding circuit 17 is supplied with quantization step data S24, as a control signal for the circuit 17 which represents the size of the quantization step STEP G employed for quantization by the quantization circuit 16. The quantization step data S24 is also supplied as the second management information S19 to the composition circuit 18. This information is composited in the transmission picture data S20 as a part of the header information of the deviation data S14.

With the above-described arrangement of the video signal coding circuit 2, when transmitting the picture data PC1 of FIG. 1(A) at the time $t_1$ in the form of intra-frame-coded data, data of a value [0], that is representing the absence of picture, is provided as the preframe data S13 supplied to the subtractor circuit 13. Therefore, the present frame data S12 is supplied, as deviation data S14, directly to the transform coding circuit 15 via the subtractor circuit 13.

At this time, the transform coding circuit 15 transmits to the quantization circuit 16 transform coding data S15 which has been intra-frame-coded. The intra-frame-coded data is thereby transmitted as part of the transmission picture data S20 to the transmission buffer memory 3. Simultaneously, the relevant deviation data S14, that is, the present frame data S12 at such time, is decoded as decoding deviation data S21 by the inverse transform circuit 19 and accumulated in the preframe memory 14.

After the picture data PC1 has been transmitted as the intra-frame-coded data, that is, during the time $t_2$, the picture data PC2 is supplied as the present frame data S12 to the subtractor circuit 13, and, at that time, the picture data PC1 is supplied from the preframe memory 14, as the preframe picture data to the subtractor circuit 13. As a result, the subtractor circuit 13 obtains deviation data S14 corresponding to the picture data PC12 of FIG. 1(B) representing the deviation between the picture data PC2 serving as the present frame data S12 and the picture data PC1 serving as the preframe data S13.

The deviation data S14 is transmitted to the transmission buffer memory 3 through the transform coding circuit 15, the quantization circuit 16, the variable-length coding circuit 17 and the composition circuit 18 so as to be included in the transmission picture data S20. The transmission picture data S20 is decoded in the inverse transform circuit 19 and then supplied, as the decoding deviation data S21, to the adder circuit 20.

At this time, that is, at the time $t_2$, the adder circuit 20 adds the decoding deviation data S21 to the preframe data S13 for representing movement of a picture held in the preframe memory, such as, the picture data PC1, into a position shifted according to the motion vector data obtained from the motion detecting circuit 21. The present frame picture data is predicated on the basis of the preframe data and is then held in the preframe memory 14.

Transmitted to the motion detecting circuit 21 at this moment are picture data PC1 constituting the preframe picture data held in the preframe memory 14, and the motion vector data S23 then provided by the circuit 21 expresses a motion of the picture data which has come to the circuit 21 from the memory 12 as the present frame data S12. The result of adding the decoding deviation data S21 and the preframe picture data S13 is stored, as a vector position expressed by the motion vector data S23, in the preframe memory 14. The motion vector data S23 is simultaneously transmitted as part of the transmission picture data S20 through the composition circuit 18.

In the video signal coding circuit 2, when transmitting the picture data PC2 of FIG. 1(A) at the time $t_2$ for obtaining inter-frame-coded data, the picture data PC12, representing a deviation between the preframe picture data PC1 and the present frame picture data PC2, is highly-efficiently-coded into inter-frame-coded data including the deviation data S14 and the motion vector data S23. Such inter-frame-coded data is supplied to the transmission buffer memory 3.

Similarly, at the times $t_3$, $t_4$, ..., when new picture data is provided from the memory 12 as the present frame data S12, the present frame data S12 is highly-efficiently-coded into inter-frame-coded data by employing the preframe picture data S13 held in the preframe memory 14. Such highly-efficiently-coded data is then transmitted to the transmission buffer memory 3.

The transmission picture data S20 received in this manner by the memory 3 and temporarily stored therein are sequentially read from the memory 3 as transmission data $D_{TRANS}$, at a predetermined data transmitting velocity determined by the transmission capacity of the transmission path 4 to the picture data recording/reproducing device 5 (FIG. 2). Remaining quantity data S25, representing the quantity of data remaining in the memory 3, is fed back to the quantization circuit 16 as a quantization size control signal, thereby controlling the quantity of data generated and supplied as transmission picture data S20 from the video signal coding circuit 2.

When the quantity of data remaining in the transmission buffer memory 3 increases up to an allowable upper limit, and the situation causing such increase is allowed to remain unchanged an overflow will eventually be induced, that is, the data quantity storable in the transmission buffer memory 3 will be exceeded. However, in such case, the feedback from the transmission buffer memory 3 causes the quantization step STEPG of the quantization circuit 16 to be increased in accordance with the increased remaining quantity data S25. Therefore, the quantity of the quantization data S16 corresponding to the deviation data S14 is reduced to thereby decrease the quantity of the transmission picture data S20. As a result, the overflow is prevented from taking place.

On the other hand, in the case of a drop in the remaining quantity data S25 down to an allowable lower limit, the feedback from the transmission buffer memory 3 controls the quantization step STEPG of the quantization circuit 16 to reduce the same in accordance with the remaining quantity data S25. In such case, the quantity of the transmission picture data S20 is incremented by increasing the generated quantity of the quantization data S16 corresponding to the deviation data S14. An underflow of the memory 3 is thus prevented.

It will be appreciated from the above that in the prior art picture data generating device 1 of FIGS. 2 and 4, the quantization step is controlled as a means for transmitting the significant picture information most efficiently while being adjusted to a transmitting condition under which the data transmitting velocity of the transmission data $D_{TRANS}$ is regulated on the basis of the transmission capacity of the transmission path 4. The foregoing follows from the emphasis placed on achieving a state in which the quantity of data remaining in the transmission buffer memory 3 invariably encounters neither an overflow nor an underflow. However, for picture data of certain types, the prior art arrangement may cause substantial deterioration of the picture quality corresponding to the transmitted picture data.

For example, in a picture PCX represented by the present frame data S12, as depicted in FIG. 5, the upper half picture data PCX1 is shown to have a relatively small amount of significant picture information, whereas, the lower half picture data PCX2 to be transmitted subsequent to the data PCX1 is shown to have an extremely large amount of significant picture information. In such case, when deviation data S14 corresponding to the upper half picture data PCX1 is quantized in the quantization circuit 16, the quantity of the data generated tends to decrease due to the small amount of significant picture information. Hence, the remaining quantity data S25 of the transmission buffer memory 3 decreases. In response thereto, the upper half picture data PCX1 is quantized with a much finer quantization step by changing the quantization step STEP G of the quantization circuit 16 to a smaller value. As a result, the data quantity of the transmission picture data S20 is incremented.

In contrast to the foregoing, when quantizing the deviation data S14 corresponding to the lower half picture data PCX2 subsequent to the data PCX1, the quantity of data generated from the lower half picture data PCX2 tends to increase. Therefore, the quantity of data S25 remaining in the transmission buffer memory 3 increases and, in response thereto, the quantization circuit 16 is controlled to increment the quantization step STEP G, thereby quantizing the lower half picture data PCX2 with a coarser or rougher quantization step. Thus, the quantity of the transmission picture data S20 is reduced.

However, if the foregoing procedure is followed, the picture quality or value of the quantized frame picture data corresponding to the lower half picture data PCX2 is deteriorated more conspicuously than that corresponding to the upper half picture data PCX1. This is likely to give rise to a disturbing impression when viewing the picture as a whole.

When recording the transmission data $D_{TRANS}$ transmitted through the transmission path 4, for example, by a CD recording device, there is a fixed data transmission quantity per frame transmissible to the transmission path 4. However, before quantizing the lower half picture data PCX2, a relatively large quantity of generated data is allocated to the upper half picture data PCX1 which contains a small amount of significant picture information. Hence, there is no choice but to transmit the lower half picture data PCX2 containing a large amount of significant picture information within the range of the remaining data generated quantity. It is therefore impossible to avoid substantial, readily apparent deterioration of the picture quality.

If the upper half picture data PCX1 is quantized with a relatively small quantization step, and if the quantization circuit 16 quantizes the lower half picture data PCX2 similarly with the small quantization step, the quantity of data supplied to the transmission buffer memory 3 as the transmission picture data S20 sharply increases because the data PCX2 has a large quantity of significant picture information. This leads to an overflow of the transmission buffer memory 3. On the other hand, if the prior art video signal coding circuit 2 of FIG. 4 is employed to prevent such overflow, the upper half picture data PCX1 containing a small quantity of significant information is quantized with a relatively small quantization step, thereby making it possible to transmit the data of a high quality picture, whereas, in the transmission of the lower half picture data PCX2 containing a large quantity of significant information, the picture data is roughly quantized by incrementing the quantization step and thereby reducing the quantity of data to be transmitted for avoiding overflow of the buffer memory. However, as earlier noted, this results in extreme deterioration of the quality of the transmissible picture data.

The video signal coding process employed in the above-described prior art system of FIGS. 2 and 4 is further insufficient for obtaining the transmission of data which presents a picture of high quality for the reason that such process is not adapted to reflect the nature of the picture to be coded.

Human spectral luminous efficacy is an important condition to be considered when estimating the quality of picture transmission. Unless this condition is considered, it is practically impossible to transmit a high quality picture.

One property involved in human spectral luminous efficacy is the so-called "visual masking effect". The "visual masking effect" refers to the phenomenon observed when a complicated picture (containing a large amount of high frequency components) and a simple picture (containing a small amount of high frequency components) are quantized with the same quantization step, and it is more difficult to detect deterioration of the quality of the complicated picture than o the simple picture.

Hence, when a complicated picture is relatively roughly quantized by a large quantization step, the deterioration of picture quality is visually undetectable.

Another property of spectral luminous efficacy is embodied in Weber's law. According to Weber's law, when a stimulus B acts on the human visual sense and the stimulus B is changed by Δ B, the least threshold Δ B/B for sensing the change Δ B is expressed as follows:

$$\frac{\Delta B}{B} = \text{Constant} \qquad (1)$$

In other words, Weber's law expresses the phenomenon that the least threshold is constant.

When this phenomenon is applied to the quantization of a differential signal of the picture, the value of the differential signal to be quantized becomes larger with an increasing error Δ B thereof, which implies that it is difficult to detect the error. However, the video signal coding process according to the prior art does not take into account the visual properties associated with a picture to be quantized, and hence cannot realize the high picture quality that can be obtained from consideration of such properties.

When static and dynamic regions of a picture are intermixed with each other, picture information changes abruptly, as in the case of a picture of an edge of a moving object, that is, at the boundary between the static and dynamic regions. If such picture information is processed in accordance with the above described prior art so that the quantization step STEP G is controlled to cause the quantity of data remaining in the transmission buffer memory 3 to fall within a predetermined range, there is the danger that noises will be generated in the part of the picture, such as the edge of the moving part, where the picture information abruptly varies.

In this connection, the human spectral luminous efficacy for a motion picture is low in the dynamic region, that is, a region in which motion appears, of the picture information, whereas it is high in the static region where no motion appears. Hence, where the static and dynamic regions are mixed, it is possible to prevent deterioration of picture quality of the generated data, in the visual sense, even when the quantization step STEP G used for quantizing the dynamic region is incremented for enhancing the quantization efficiency.

However, if rough quantization is effected by incrementing the quantization step STEP G for the dynamic region, when quantizing a boundary of a picture part at which the picture information abruptly changes between the dynamic region and the static region, this results in the generation of noises at such boundary.

This phenomenon will probably also appear at the boundaries between dynamic regions exhibiting different motions.

When examining the content of a picture, it will be seen that, in the great majority of cases, the picture information abruptly varies, for example, as at an object edge, or at the boundary between a complicated picture region and a simple picture region. If such picture is roughly quantized by a quantization step of a large value, this results in so-called "mosquito noises" at the edge part or in the generation of transmission data which presents a picture in which the complicated picture region is not smoothly connected to the simple picture region.

Furthermore, in the picture data generating system 1 according to the prior art, the differential data S14 is discrete-cosine-transformed (DCT) in the transform coding circuit to obtain the transform coding data S15. In such case, the weight given to a low frequency component of a spatial frequency is increased, and weight given to a high frequency component thereof is decreased. As a result, the quantization step STEP G is incremented for the high frequency components as compared with the quantization step STEP G for the low frequency components of the spatial frequency By reason of this arrangement, there can be incremented weighting of a region where human spectral luminous efficacy is relatively high and deterioration is easily detected, whereas weighting of a region where the spectral luminous efficacy is low and the deterioration is hard to be detected can be decremented. Hence, compression efficiency of the picture data is improved while enhancing the subjective picture quality.

In fact, however, when variable weighting is employed without limits irrespective of the nature of the picture, the high frequency information may be compressed to cause fading of the picture, if the entire quantity of picture information is small and the picture contains a good deal of high frequency components of the spatial frequency. This results in deterioration of the picture quality. For instance, in the case where a part of the picture to be transmitted contains high frequency components but no low frequency components, if the high frequency information is compressed, there may be no signal remaining to be transmitted.

OBJECTS AND SUMMARY OF THE INVENTION

Accordingly, it is an object of this invention to provide a method of coding video signals by which highly-efficiently-coded data can be obtained, and in which higher enhancement of the picture quality is attained by controlling a quantization step in accordance with a significant picture information quantity to be transmitted.

Another object of this invention is to provide a method of coding video signals in which a quantization step is controlled in accordance with a quantity of picture information to be transmitted, and in which transmission data exhibiting a high picture quality can be generated with high efficiency by adapting the coding process to properties of human spectral luminous efficacy which work against deterioration of the picture.

Another object of this invention is to provide a method of coding video signals in which a quantization step is controlled in accordance with relative variations in picture information between a coded sub-region and adjacent sub-regions to thereby generate transmission data exhibiting a much clearer picture of a dynamic or moving part thereof.

Still another object of this invention is to provide a method of coding video signals in which a quantization step is controlled in accordance with variations in picture information to be transmitted so as to further improve the picture quality of the transmission data.

A further object of this invention is to provide a video signal transmission system for transmitting digital video signals by highly-efficient-coding of the video signals, and in which a quantization step is increased for a high frequency component of a spatial frequency with respect to a region which is higher than a threshold level set therefore in dependence on the entire quantity of picture information, so that picture data can be highly-efficiently-coded, and at the same time deterioration of the picture quality can be prevented.

In accordance with a first aspect of this invention, in a video signal coding method by which digital video signals are quantized to highly-efficiently-coded data, there is provided the improvement comprising the steps of: distributing to each of a plurality of sub-regions which make up a main region, a portion of a main region transmission allowable data quantity constituting a sub-region transmission allowable data quantity corresponding to a digital video signal quantity of the respective sub-region, the main region transmission allowable data quantity being allocated to the main region for indicating predetermined picture information to be transmitted; and determining a quantization step used for quantizing the digital video signals of each of the sub-regions on the basis of the respective transmission allowable data quantity.

In a modification of the method according to the first aspect of this invention; the quantization step used for quantizing the digital video signals of each of the sub-regions is determined on the basis of a ratio of the digital video signal quantity of the main region to the digital video signal quantity of the respective one of the sub-regions which make up the main region.

In another modification of the method according to the first aspect of this invention, the quantization step is made to be proportional to the digital video signal quantity with respect to the sub-regions which make up the main region for indicating predetermined picture information to be transmitted; and a constant amount of data is generated from the sub-regions by quantizing the digital video signals of the sub-regions by means of a suitably controlled quantization step.

In accordance with a second aspect of this invention, in a video signal coding method by which digital video signals are quantized by a quantization step to generate transmission data, there is provided the improvement comprising the step of variably controlling a value of the quantization step in accordance with a picture information quantity to be transmitted.

In a modification of the method according to the second aspect of this invention, the generated transmission data are transmitted through a transmission buffer memory, and the value of the quantization step is further variably controlled in accordance with remaining quantity data indicating the quantity of data in the transmission buffer memory.

In accordance with a third aspect of this invention, in a video signal coding method by which digital video signals are quantized by a quantization step to generate transmission data, there is provided the improvement comprising the steps of generating static degree data representing a degree of variation between picture information contained in a picture region being coded for transmission and picture information contained in an adjacent picture region, and controlling the quantization step on the basis of the static degree data and data indicating motion of the picture region being coded.

In a modification of the method according to the third aspect of the invention, transformation ratio data are obtained on the basis of the static degree data and data indicating motion of the coded picture region, and the quantization step is controlled by transforming a feedback quantization step which is determined in response to the quantity of data remaining in a buffer memory in accordance with the transformation ratio data.

In accordance with a fourth aspect of this invention, in a video signal coding method by which digital video signals are quantized by a quantization step to generate transmission data, there is provided the improvement comprising the steps of obtaining differential information representing variations both in first picture information of a coded picture region and in second picture information of a picture region adjacent to the coded picture region, and determining a quantization step used for quantizing a digital video signal of the coded picture region on the basis of the differential information.

In accordance with a fifth aspect of this invention, in a video signal transmission system for transmitting digital video signals by highly-efficient-coding of the video signals; a picture information quantity for transmission of one-frame is detected while simultaneously setting a threshold level for a predetermined region on the basis of the detected picture information quantity, which region has a picture information quantity greater than the threshold level; and the video signals are transmitted by increasing a quantization step with respect to a high frequency component of a spatial frequency in the predetermined region.

The above, and other objects, features and advantages of this invention, will be apparent in the following detailed description of preferred embodiments when read in connection with the accompanying drawings in which corresponding parts or components are identified by the same reference numerals and characters in the several views.

BRIEF DESCRIPTION OF THE DRAWINGS

FIGS. 1A and 1B are schematic diagrams to which reference is made explaining a highly-efficient-coding process;

FIG. 2 is a block diagram depicting a prior art picture data generating system;

FIGS. 9 through 13 are flowcharts showing the steps of respective modifications of the video signal coding method according to the first embodiment;

DETAILED DESCRIPTION OF PREFERRED EMBODIMENTS

Figure 4:
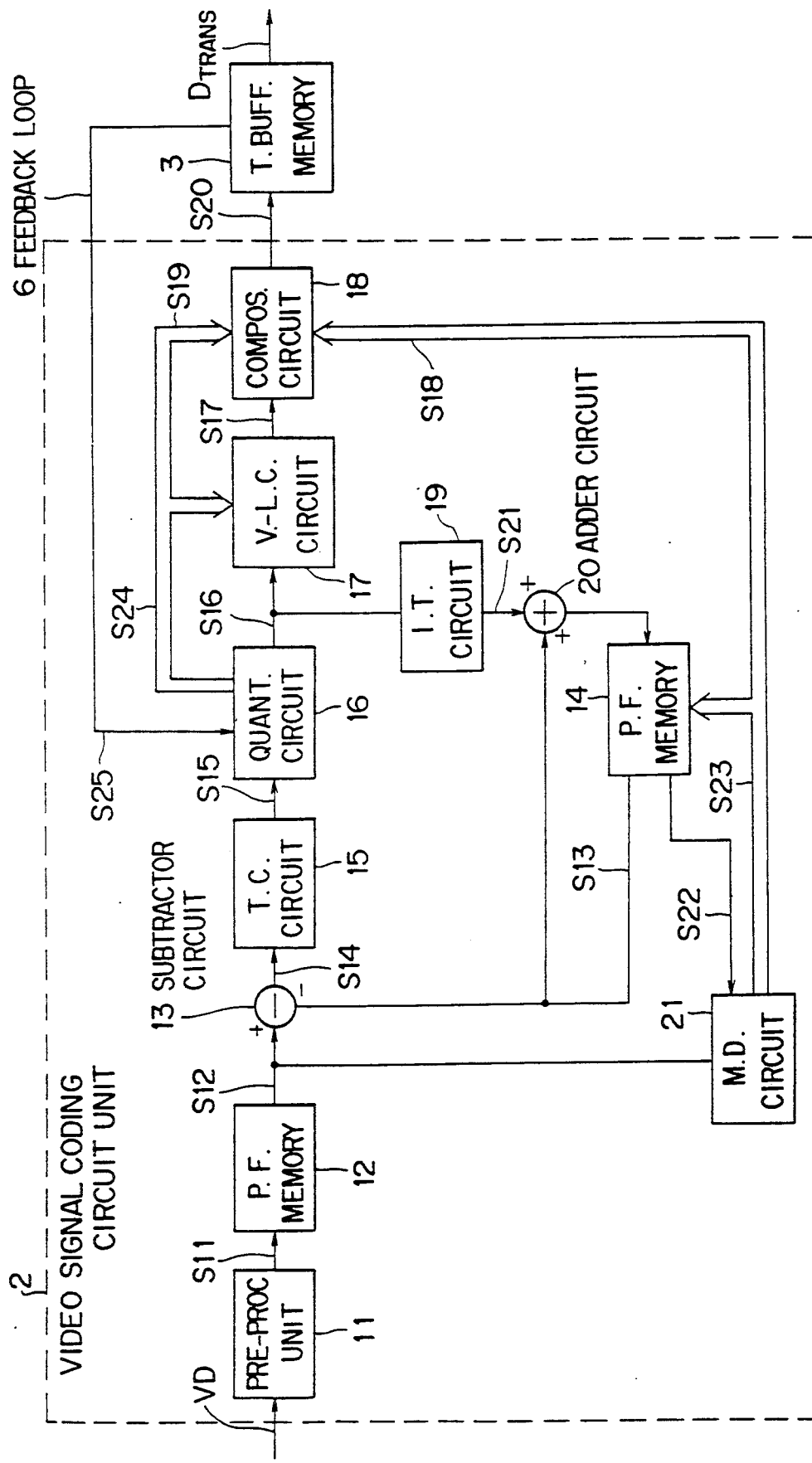
FIG. 4 is a block diagram illustrating in greater detail a component of the prior art system of FIG. 2.
Figure 6:
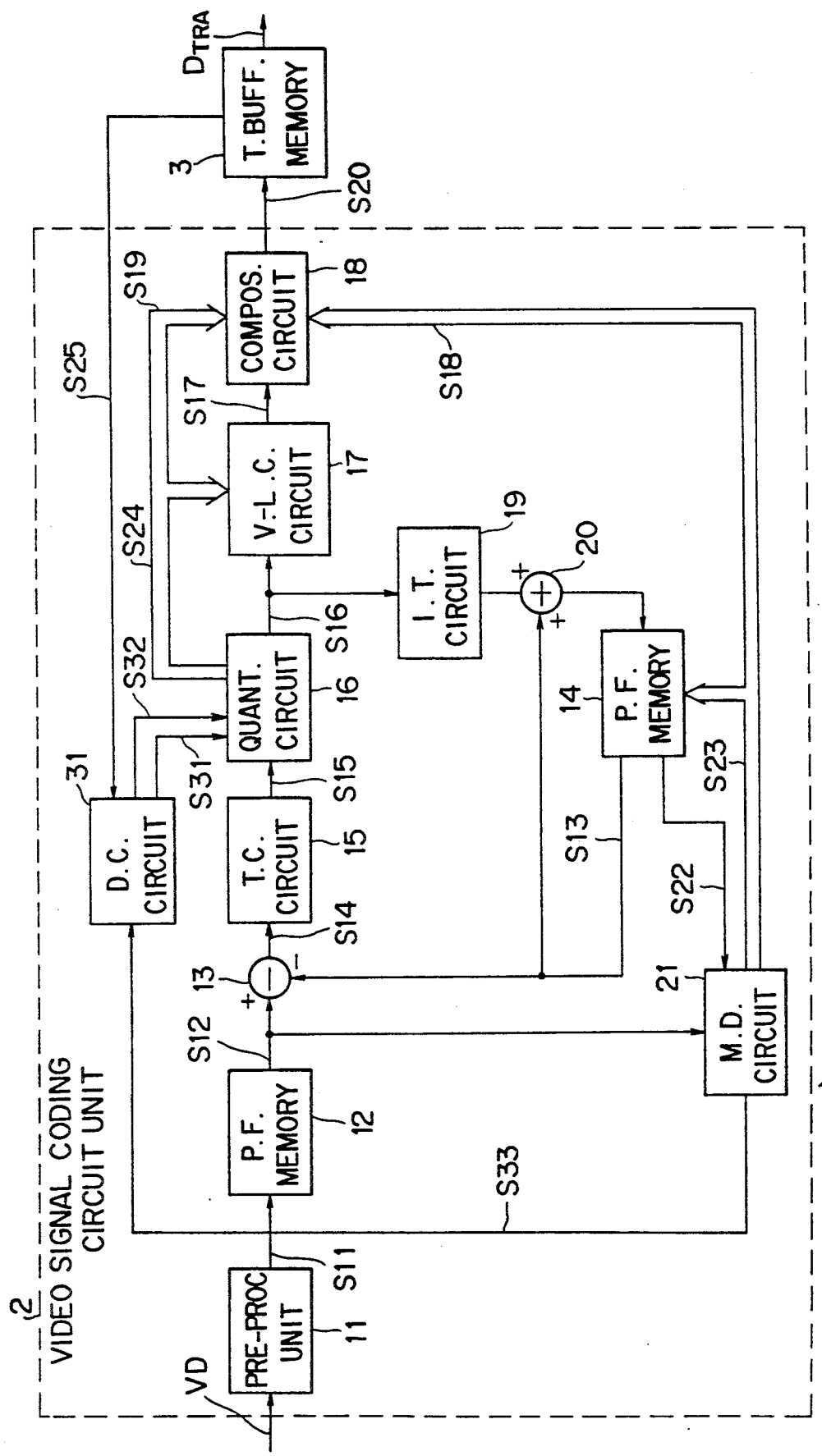
FIG. 6 is a block diagram illustrating a picture data generating system employing a video signal coding method according to a first embodiment of the present invention.

Referring specifically to FIG. 6, in which components corresponding to those described with reference to FIG. 4 are identified by the same reference numerals, it will be seen that, in a picture data generating system employing a video signal coding method according to a first embodiment of the present invention, a quantization step used in a quantization circuit 16 is controlled by a quantization step control signal S31 and an overflow/underflow prevention signal S32 provided by a data control circuit 31.

Figure 7:
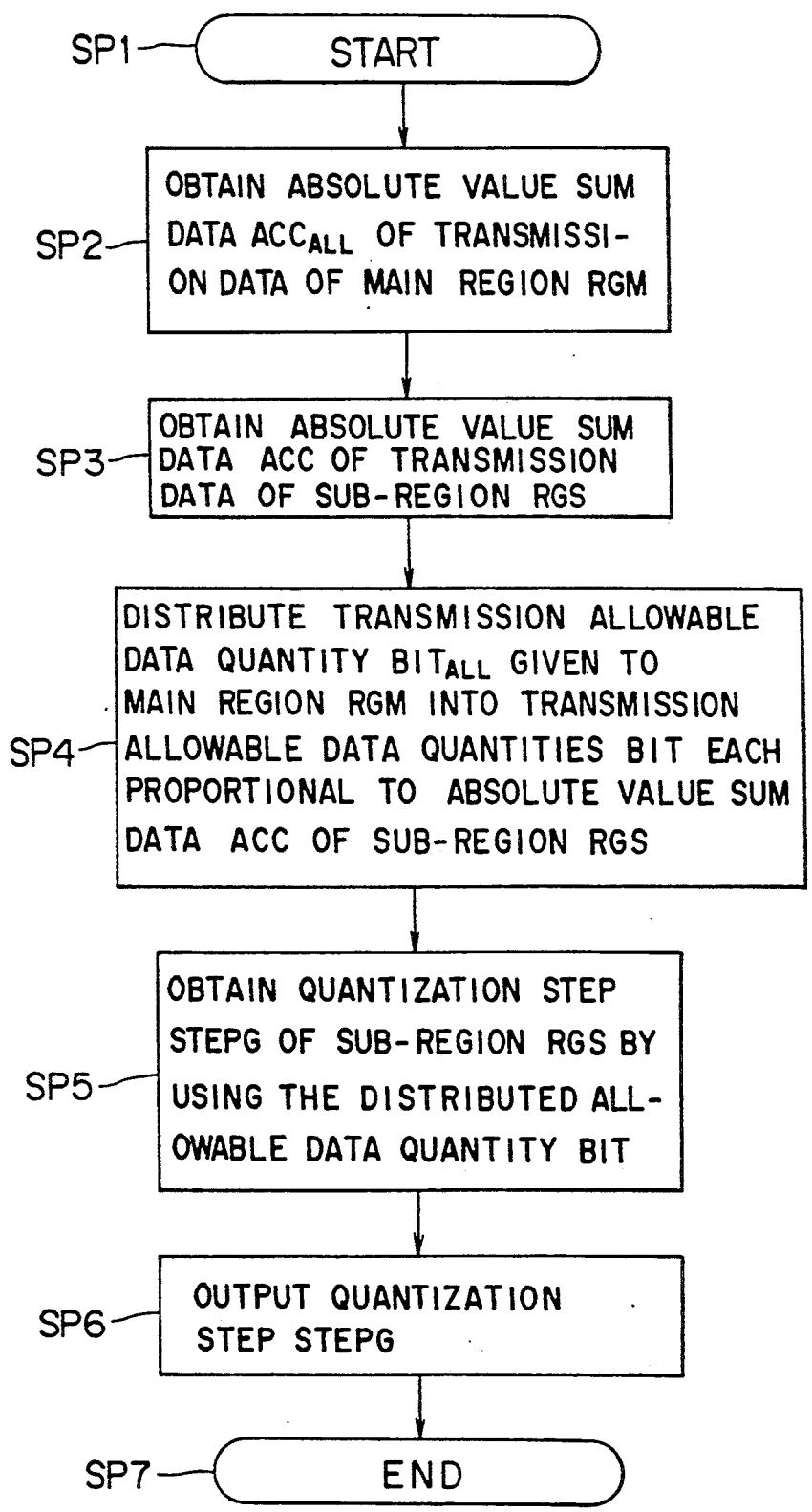
FIG. 7 is a flowchart showing the steps of the video signal coding method according to the first embodiment of the invention.

In the data control circuit 31, quantization step calculating procedures shown in FIG. 7 are employed for allocating a transmission allowable data quantity, corresponding to a significant picture information quantity, with respect to a picture part of each frame to be transmitted on the basis of transmission data information S33 from a motion detecting circuit 21 and quantization data S16 from the quantization circuit 16. Subsequently, the picture data having a uniform quality over the entire picture is quantized so as to avoid an overflow or underflow in a transmission buffer memory 3.

In the quantization step calculating procedures of FIG. 7, the data control circuit 31 divides a main region RGM (FIG. 8) serving as a 1-frame picture into sub-regions RGS each comprised of a 16 pixels × 16 pixels transmission unit block. The circuit 31 then quantizes, to transmission data, respective pixel data DATA constituting significant picture information of the sub-regions RGS.

To be more specific, after the data control circuit 31 enters the quantization step calculating procedures at a step SP1, absolute value sum data $ACC_{ALL}$ of the transmission data of the main region RGM is calculated at a step SP2 as follows:

$$ACC_{ALL} = \Sigma_{RGM} |DATA| \ldots \quad (2)$$

In the formula (2), the pixel data DATA indicates pixel transmission data constituting the main region RGM. An absolute value sum of the pixel transmission data DATA is computed with respect to the main region RGM, thereby obtaining the main region absolute value sum data $ACC_{ALL}$ representing a total data quantity, that is, a significant picture information quantity of the main region, to be transmitted in connection with the main region RGM.

In the embodiment being described, when transmitting intra-frame-coded data, the pixel transmission data DATA consists of differential data indicating a difference between each pixel data and a mean value of the pixel data for the 256 pixels contained in the respective sub-region RGS. When transmitting inter-frame-coded data, the pixel transmission data DATA consists of deviation data indicating a deviation between present frame pixel data and preframe pixel data for respective pixels contained in the respective sub-regions RGS.

After carrying out such processes, the data control circuit 31 proceeds to a step SP3 to compute absolute value sum data ACC of the pixel transmission data DATA, that is, transmission unit block data for the sub-regions RGS. The data ACC is expressed as:

$$ACC = \Sigma_{RGS} |DATA| \ldots \quad (3)$$

As a result, a significant picture data quantity for the sub-regions RGS is obtained.

Then, in a step SP4, the data control circuit 31 distributes a transmission allowable data quantity $BIT_{ALL}$ for the main region RGM into sub-region transmission allowable data quantities BIT for the sub-regions RGS each having a value proportional to the absolute value sum data ACC. The sub-region transmission allowable data quantity BIT is given by:

$$BIT = BIT_{ALL} \times \frac{ACC}{ACC_{ALL}} \quad (4)$$

The main region transmission allowable data quantity $BIT_{ALL}$ involves the use of a statistically predicted value for its transmission through a transmission path 4 without causing a deficiency or excess on the basis of a data generated quantity at the time of a prior transmission of the inter-frame-coded data or the intra-frame coded data.

Subsequently, at a step SP5, the data control circuit 31 determines a quantization step STEP G for each of the sub-regions RGS on the basis of the distributed transmission allowable data quantity BIT, as follows:

$$STEP\ G = K \times \frac{ACC}{BIT} \quad (5)$$

In the next step SP6, data control circuit 31 supplies the calculated quantization step STEP G, as the step control signal S31, to the quantization circuit 16. Thereafter the quantization step calculating procedures come to an end at a step SP7. The quantization steps in the quantization circuit 16 are controlled for each sub-region RGS by the respective quantization step STEP G obtained at the step SP5.

Based on the arrangement described above, with one-frame significant picture information being quantized, a relatively large transmission allowable data quantity BIT can be distributed to the picture part having a good deal of significant picture information. Values of the quantization steps STEP G associated with one-frame picture as a whole can be practically made uniform. Thus, it is feasible to transmit picture data exhibiting a practically uniform picture quality in the respective parts of the picture.

When determining the quantization step STEP G in accordance with the formula (5), as will be mentioned later, a theoretically proper quantization step STEP G can be selected.

More particularly, a data generated quantity [bit] in arbitrary sub-regions RGSX which make up the main region RGM may be generally expressed by:

$$\text{Data Generated Quantity [bit]} = \quad (6)$$

$$\Sigma_{RGSX}\left(\text{Code Length}\left(\frac{|\text{Objective Data}|}{\text{Quantization Step}}\right)\right)$$

As expressed in formula (6), the data generated quantity is obtained by integrating, with respect to arbitrary sub-regions RGSX, the code length determined by a value acquired by dividing an absolute value of the objective data for quantization by the quantization step.

If a coding method, for example, a VLC method, is adopted so that [Code Length] is substantially proportional to [|Objective Data| / Quantization Step] a relationship between [|Objective Data| / Quantization Step] and the data generated quantity is expressed as:

$$\text{Data Generated Quantity} \propto \Sigma_{RGSX}\left(\frac{|\text{Objective Data}|}{\text{Quantization Step}}\right) \quad (7)$$

As is obvious from formula (7), a proportional relationship is established. This relationship may be modified as follows:

$$\text{Data Generated Quantity} \propto \frac{\Sigma RGSX |\text{Objective Data}|}{\text{Quantization Step}} \quad (8)$$

From formula (8), it can be understood that there is established a proportional relationship between an integrating result obtained by integrating the absolute value of the objective data in association with the sub-regions RGSX and the data generated quantity.

Hence, the data generation quantity can be expressed as:

$$\text{Data Generated Quantity} = K \times \frac{\Sigma RGSX |\text{Objective Data}|}{\text{Quantization Step}} \quad (9)$$

where K is the proportional coefficient.

The quantization step is thereby given by:

$$\text{Quantization Step} = K \times \frac{\Sigma RGSX |\text{Objective Data}|}{\text{Data Generated Quantity}} \quad (10)$$

As shown above, the quantization step is expressed by a value which is obtained by dividing the integrating value of the objective data in the sub-regions RGSX by the data generated quantity, and multiplying the result of such division by the proportion coefficient K.

When considering formula (5) in terms of the result of this theoretical analysis; and if the sub-region transmission allowable data quantity BIT can be allocated as a data generated quantity in formula (10), it is apparently possible to determine a quantization step value needed for generating the data having a quantity equivalent to the allocated sub-region transmission allowable data quantity.

The proportional coefficient K can be determined by experience or empirically. For example, if pictures of a similar nature occur in a continuous sequence, that is, there is autocorrelativity as in the case of video signals, the proportional coefficient K is substantially constant.

Hence, if the proportional coefficient K and the data integrating value in the sub-regions RGS are known, the quantization step can be obtained directly by a feed-forward method, instead of using a feedback loop, as at 6 in the prior art shown in FIG. 4, provided that the quantity of data to be generated is specified.

A modification of the embodiment of the invention described above with reference to FIGS. 6 and 7 will now be described with reference to FIG. 9. Generally, in the embodiment illustrated in FIG. 7, the data control circuit 31 obtains the absolute value sum data $ACC_{ALL}$ of the transmission data in the main region RGM at the step SP2 from the present frame data which is to be presently transmitted, whereas, in the modification illustrated in FIG. 9, the data $ACC_{ALL}$ is obtained as a result of preframe coding.

Figure 9:
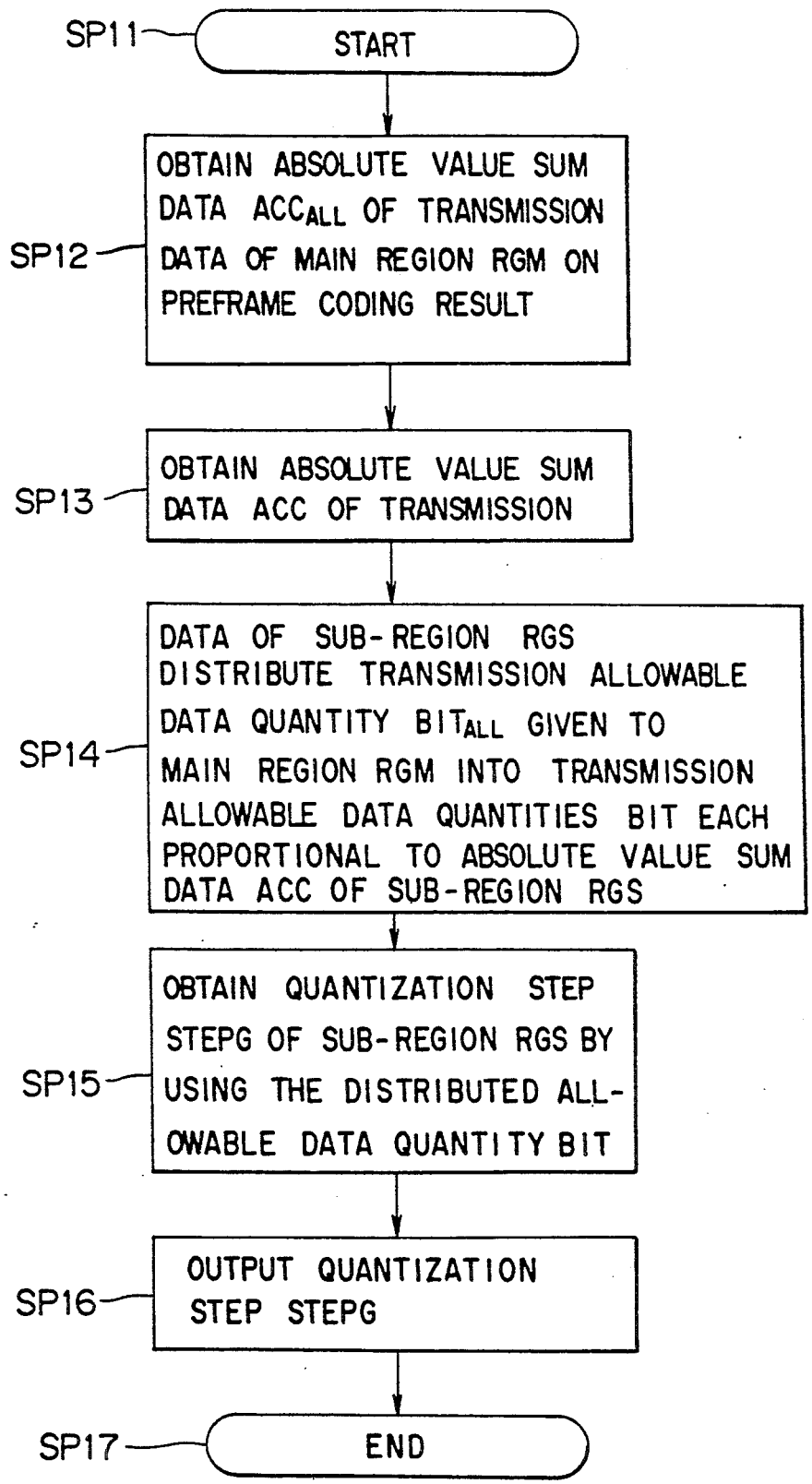

More specifically, in the case of FIG. 9, when entering the quantization step calculating procedures at a step SP11, the data control circuit 31 first obtains, at a step SP12, the absolute value sum data $ACC_{ALL}$ of the transmission data with respect to the main region RGM of the preframe derived from the result of preframe coding. Thereafter, in the modification of FIG. 9, at steps SP13, SP14, SP15 and SP16, the data control circuit 31 executes the same arithmetic operations as described above for the steps SP3, SP4, SP5 and SP6 of FIG. 7. After such execution, the quantization step calculating procedures are terminated at a step SP17.

In the method according to FIG. 9, the absolute value sum data $ACC_{ALL}$ is obtained on the basis of the preframe data, and the necessity of waiting for execution of a process on the present frame is thereby eliminated. As in the case of the method described with reference to FIG. 7, the method illustrated in FIG. 9 can be similarly used for adequately controlling the quantization step.

Further, by reason of the strong autocorrelation between consecutive frames of video signals, it can be considered that the absolute value sum data $ACC_{ALL}$ of the transmission data associated with the main region RGM of the preframe practically exhibits no difference from the absolute value sum data $ACC_{ALL}$ of the transmission data associated with the main region RGM of the present frame. Therefore, a quantization step STEP G which is adequate can be calculated on the basis of the absolute value sum data $ACC_{ALL}$ of the relevant preframe or of the present frame.

FIG. 10 shows another modification of the embodiment of the invention described above with reference to FIGS. 6 and 7, and in which the data control circuit 31 obtains the quantization step from the absolute value sum data $ACC_{ALL}$ of the transmission data associated with the main region RGM and from a transmission allowable data quantity $BIT_{ALL}$.

More specifically, in the method of FIG. 10, the data control circuit 31 enters the quantization step calculating procedures at a step SP21, and the absolute value sum data $ACC_{ALL}$ of the transmission data relative to the main region RGM is obtained at a step SP22. Then, in a step SP23, the data control circuit 31 obtains the quantization step STEP G by using the transmission allowable data quantity $BIT_{ALL}$ given to the main region RGM by means of the below formula:

$$\text{STEP } G = K \times \frac{ACC_{ALL}}{BIT_{ALL}} \quad (11)$$

After transmitting the quantizaiton step STEP G to the quantization circuit 16, at a step SP24, the procedures shown in FIG. 10 come to an end at a step SP25.

When transform coding data S15 with respect to the sub-regions RGS constituting the main region RGM reaches the quantization circuit 16 (FIG. 6), the data control circuit 31 executes the quantization by use of the quantization step STEP G common to all the sub-regions.

In other words, in the method embodying the invention which has been described with reference to FIG. 10, a common quantization step STEP G is used for all the sub-regions RGS belonging to the main region RGM.

For sub-regions of the main region RGM which have a large difference, a ratio for differential data of the quantization step STEP G is small. Therefore, the quantization is effected to increment the data generation quantity. On the other hand, in the sub-regions having a small difference, the ratio for the differential data of the quantization step STEP G is large, and the quantization is performed to decrement the data generated quantity.

In connection with the main region transmission allowable data quantity $BIT_{ALL}$ allocated to the main region RGM, a large proportion of the transmission allowable data can be allocated to those regions of the frame picture data requiring a large data quantity. This eliminates the possibility of generating transmission data that may partially deteriorate the picture quality over the entire main region RGM. Thus, transmission having high picture quality can be generated.

With respect to the sub-regions combined to form a main region RGM, the quantization step STEP G obtained by the formula (11) can be acquired, as in the embodiment described with reference to FIGS. 6 through 8, by distributing the main region transmission allowable data quantity $BIT_{ALL}$ in accordance with a distribution of the significant picture information quantities of the sub-regions RGS constituting the main region RGM.

Thus, in a further modification, formula (4) is substituted into the sub-region transmission allowable data quantity BIT of formula (5). In such case, the quantization step STEP G is as follows:

$$STEP\ G = K \times \frac{ACC}{BIT_{ALL} \times \frac{ACC}{ACC_{ALL}}} \quad (12)$$

There is a transforming method to establish a proportional relationship between the sub-region transmission allowable data quantity BIT and the main region transmission allowable data quantity $BIT_{ALL}$ in formula (4). When transforming the data in the transform coding circuit 15 by the above-mentioned transforming method, the absolute value sum data ACC can be removed from the numerator and denominator whereupon, formula (12) can be rewritten as follows:

$$STEP\ G = K \times \frac{ACC_{ALL}}{BIT_{ALL}} \quad (13)$$

The fact that the right side of formula (13) does not contain the sub-region absolute value sum data ACC implies that, even when the distribution of the picture significant information associated with the sub-regions RGS included in the main region RGM is unknown, there can be achieved the same effect as that yielded when allocating the main region transmission allowable data quantity $BIT_{ALL}$ on the basis of the distribution of the significant picture information quantity for the sub-regions RGS, so long as the main region absolute value sum data $ACC_{ALL}$ with respect to the whole main region RGM can be obtained. This is attainable simply by determining the quantization step STEP G common to all the sub-regions RGS in accordance with the main region transmission allowable data quantity $BIT_{ALL}$ given to the main region RGM.

In the embodiment of FIG. 10, it is possible to properly allocate, to the several sub-regions RGS, the main region transmission allowable data quantity $BIT_{ALL}$ imparted to the main region RGM so that transmission data presenting a good picture quality can be generated.

Referring now to FIG. 11, it will be seen that, in still another modification of the embodiment of this invention described with reference to FIGS. 6-8, the absolute value sum data $ACC_{ALL}$ is obtained on the basis of the result of coding the preframe rather than on the basis of the result of coding the present frame, as at the step SP22 in FIG. 10.

To be more specific, the data control circuit 31, after entering the quantization step calculating procedures at a step SP31, obtains the absolute value sum data $ACC_{ALLP}$ of the transmission data with respect to the main region RGM on the basis of the preframe coding result at a step SP32. The thus obtained data $ACC_{ALLP}$ serves as the equivalent of the absolute value sum data $ACC_{ALL}$ of the transmission data of the main region RGM of the present frame.

The data control circuit 31 performs the arithmetic operation of formula (13) at a subsequent step SP33 by using the above noted equivalent of the absolute value sum data $ACC_{ALL}$ and the transmission allowable data quantity $BIT_{ALL}$ given to the main region RGM of the present frame, thus obtaining the quantization step STEP G of the sub-regions RGS. After transmitting the quantization step STEP G to the quantization circuit 16 at a step SP34, the quantization step calculating procedures are terminated at a step SP35.

In accordance with the method of FIG. 11, the absolute value sum data $ACC_{ALLP}$ of the preframe is employed as the absolute value sum data $ACC_{ALL}$ of the present frame. This, in turn, enables execution of the quantization associated with the present frame while the absolute value sum data $ACC_{ALL}$ remains unknown. In consequence of the foregoing, the construction for executing the quantizing process and the method steps or procedures therefore can be further simplified, and hence deterioration of picture quality of the transmission data can be practically prevented.

Since video signals characteristically have a large correlation of picture content in consecutive frames, any difference between the absolute value sum data $ACC_{ALLP}$ of the preframe and the absolute value sum data $ACC_{ALL}$ of the present frame can be practically ignored. Thus, it is feasible to avoid deterioration of the picture quality or the improper incrementing or decrementing of the quantity of data remaining in the transmission buffer memory 3 even when the quantization step STEP G is obtained on the basis of the preframe picture data, as in FIG. 11.

In the embodiment of the invention described with reference to FIGS. 6-8 and in the modifications thereof described with reference to FIGS. 9, 10 and 11, respectively, the proportional coefficient K, for example, as used in formulas (5), (11) and (13) for calculating the quantizing step STEP G, is set beforehand to a predetermined value. However, in yet another modification described below with reference to FIG. 12, the accuracy of the proportional coefficient K is enhanced when sequentially quantizing the picture data of consecutive frames. More specifically, in FIG. 12, the data control circuit 31 initiates proportional coefficient updating procedures at a step SP41. The circuit 31 sets an initial value K(0) for every sub-region, that is, for each transmission unit block, at a step SP42. At the next step SP43, the initial value K(0) is updated to an update value $K_X(i)$.

In this embodiment, the initial value K(0) may be previously input from the outside to the data control circuit 31.

The data control circuit 31 finishes the initialization and executes a process to transmit a quantization step control signal S31 to the quantization circuit 16 at the conclusion of such initialization.

More specifically, the update value $K_X(i)$, which has become the initial value K(0) is used, at a step SP44, in calculating the quantization step STEP G, as in the following variation of the formula (5):

$$\text{STEP } G = K_X(i) \times \frac{ACC}{BIT} \quad (14)$$

Thereafter, the quantization is executed in the quantization circuit 16 by use of the quantization step STEP G at a step SP45.

At this moment, the quantization circuit 16 generates quantization data S16 pertaining to the picture data of the sub-regions RGS. At a subsequent step SP46, the data control circuit 31 detects a data generated quantity $BIT_R$ of the sub-regions RGS on the basis of the quantization data S16. At the next step SP47, a true value K(i) is calculated from the data generation quantity $BIT_R$, the sub-region absolute value sum data ACC obtained by formula (3) and the quantization STEP G obtained at step SP44, as follows:

$$K(i) = \text{STEP } G \times \frac{BIT_R}{ACC} \quad (15)$$

It is implied by formula (15) that the relationship shown in formula (10) is transformed into a formula for obtaining the proportional coefficient K preparatory to its application.

Thereafter, at a step SP48, the data control circuit 31 executes the following arithmetic operation:

$$K_X(i+1) = \alpha K_X(i) + (1-\alpha) K(i) \quad (16)$$

A new update value $K_X(i+1)$ is thereby obtained to replace the update value $K_X(i)$ when effecting quantization of the next frame.

In formula (16), $\alpha$ represents a mixing ratio. The new update value $K_X(i+1)$ is seen to be a mixture of the update value $K_X(i)$ used in the present frame and the true value K(i) at the mixing ratio $\alpha$. In other words, the update value $K_X(i)$ employed for quantization is modified by the true value K(i).

Thus, a state is attained in which the update value $K_X(i)$ used for quantizing the picture data of the next frame is modified to a proper update value by referring to the actually generated data generated quantity $BIT_R$ resulting from quantization using the update value $K_X(i)$ corresponding to the initial value K(0). The data control circuit 31 initiates the processing of the next frame and returns from the step SP48 to the step SP44 via a respective loop LOOP. Thus, the data control circuit 31 executes processing of the repetitive loop LOOP consisting of the steps SP44 - SP45 - SP46 - SP47 - SP48 - SP44 with respect to the next frame.

The data control circuit 31 goes on updating each new update value $K_X(i)$ while learning the result of the respective quantization executed repeatedly, thereby obtaining a proportional coefficient which adequately corresponds to variations in the significant picture information to be transmitted as a proportional coefficient K in each sub-region.

Figure 8:
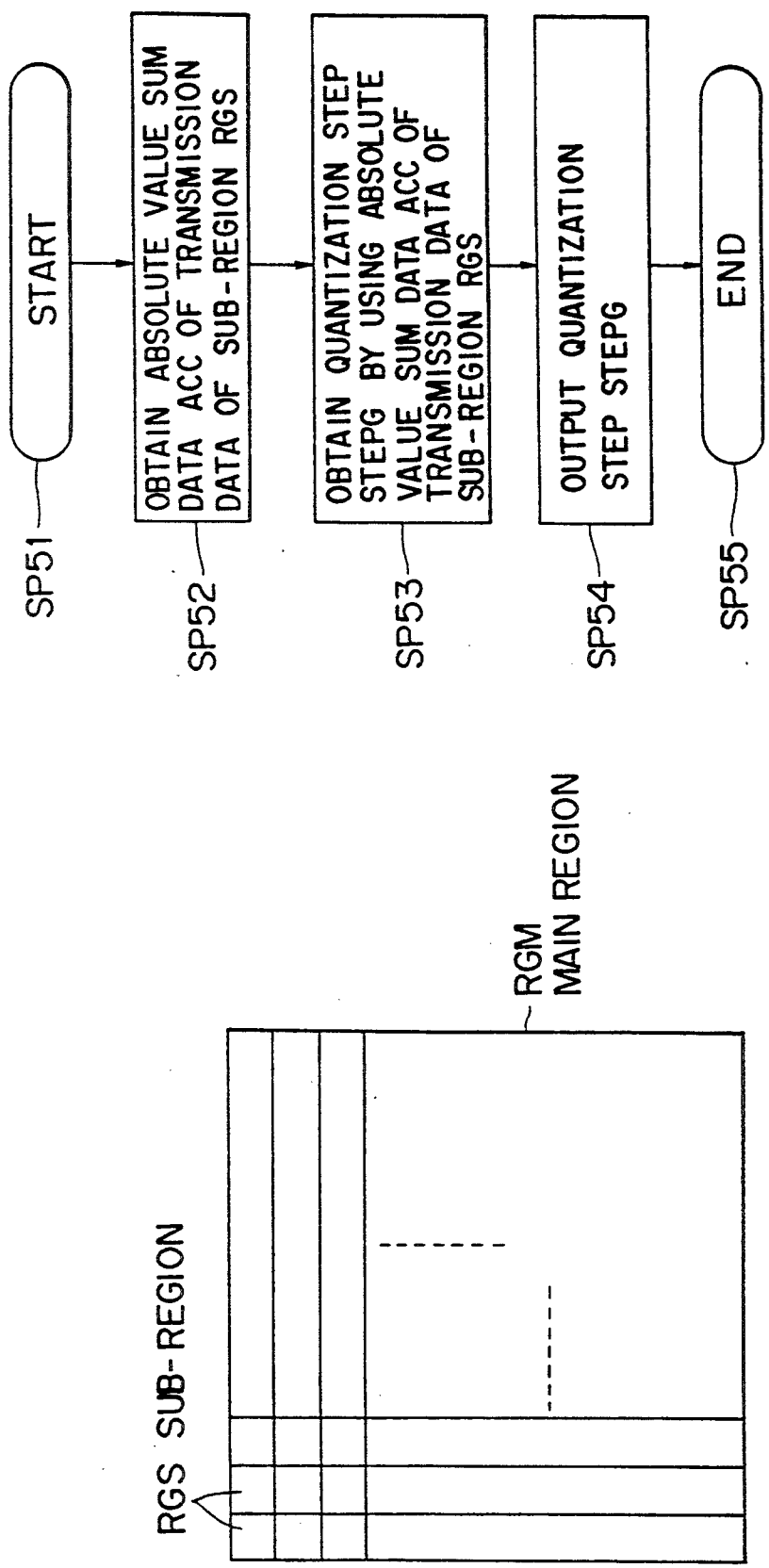
FIG. 8 is a schematic diagram to which reference will be made in explaining regions to which coding steps are allocated.

Turning now to FIG. 13, it will be seen that, in still another modification of the embodiment of the invention described with reference to FIGS. 6-8, the data control circuit serves to lessen deterioration of the picture quality by allocating a quantization step STEP G which makes the data generated quantity uniform with respect to all the sub-regions RGS combined to form the main region RGM (FIG. 8).

More specifically, in FIG. 13, the data control circuit 31 initiates the quantization step calculating procedures at a step SP51, and then proceeds to a step SP52 in which the absolute value sum data ACC of the transmission data in regards to all the sub-regions RGS is given by the following formula.

$$ACC = \Sigma_{RGS} |DATA| \quad (17)$$

Thereafter, in a step SP53, this absolute value sum data ACC is employed for determining the quantization step STEP G as follows:

$$\text{STEP } G = K1 \times ACC \quad (18)$$

The resulting quantization step STEP G is output at a step SP54, and then the calculating procedures or routine ends at a step SP55.

In formula (18), K1 is the proportional coefficient obtained from the above-described relationship in formula (10). More specifically, from the relationship of formula (10), the quantization step STEP G has the following relationship for each sub-region RGS.

$$\text{STEP } G = K \times \frac{ACC}{BIT} \quad (19)$$

The data generated quantity BIT for each sub-region is set to a common constant value C, that is:

$$BIT = C \quad (20)$$

When formula (20) is substituted into formula (19), the latter is modified as follows:

$$\text{STEP } G = \frac{K}{C} \times ACC \quad (21)$$

Substituting formula (21) in formula (18), results in the following:

$$K1 = \frac{K}{C} \quad (22)$$

Figure 3:
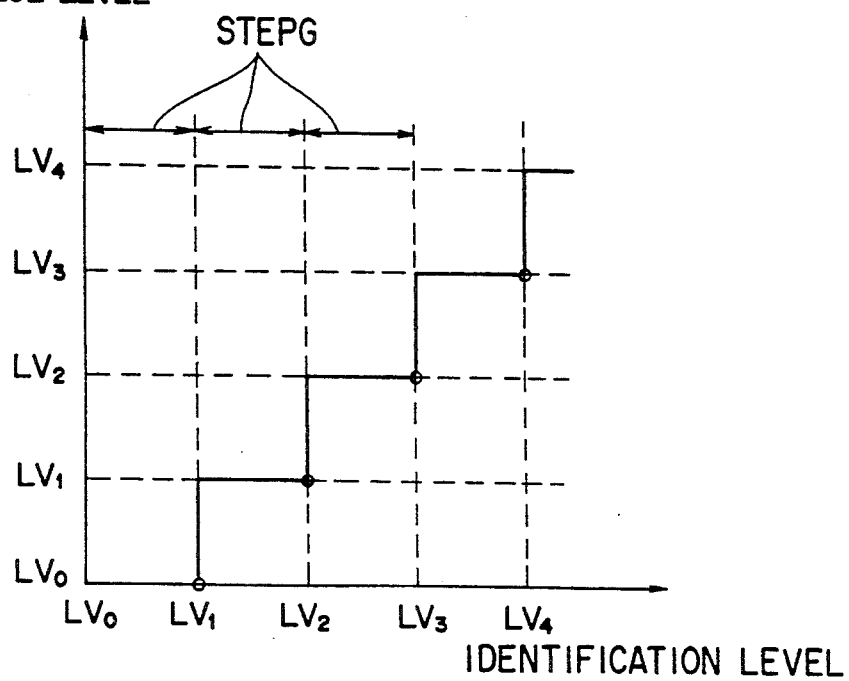
FIG. 3 is a characteristic diagram or graph to which reference is made in explaining a quantization step.
Figure 5:
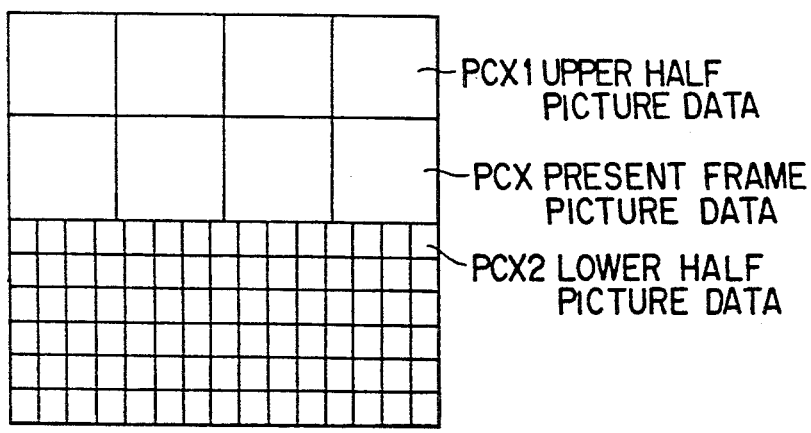
FIG. 5 is a schematic diagram to which reference is made in explaining present frame picture data to be transmitted.

According to the arrangement shown in FIG. 13, as expressed by formula (18), the quantization step STEP G is controlled to a value proportional to the absolute value sum data ACC. It is therefore feasible to allocate a quantization step STEP G which results in generation of the same data quantity with respect to all the sub-regions RGS constituting the main region RGM. This, in turn, enables generation of transmission data by which the extreme deterioration of the picture quality, for example, as described in conjunction with FIG. 5, can be prevented.

The embodiment of the invention illustrated in FIGS. 6-8 and the modifications thereof discussed above have all dealt with the case where the unit for setting the quantization step STEP G is the sub-region RGS corresponding to a single transmission unit block of the main region RGM composed of one-frame picture. However, the sizes of the main region RGM and of the sub-region RGS are no so limited. Thus, for example, a plurality of frames may be selected as a main region RGM. In that case, each of the sub-regions RGS may be constituted by one frame, or a plurality of transmission unit blocks, or a single transmission unit block.

Alternatively, as the main region RGM, there can be selected a plurality of divided regions of one frame and, in that case, a plurality of transmission unit blocks or a single transmission unit block may be selected to comprise each of the sub-regions RGS.

In the modification described above with reference to FIG. 12, the update value $K_X(i)$ is updated by using the true value $K(i)$ at the step SP48. In the example, expressed by formula (16), the update value $K_X(i+1)$ is a composite, at the ratio $\alpha$, of the true value $K(i)$ obtained on the basis of the data generated quantity $BIT_R$ actually generated from the present frame and the update value $K_X(i)$ employed for quantizing the present frame. The formula (16) may be replaced by the following: ps $$K_X(i+1) = K(i) \qquad (23)$$

As shown in formula (23), the true value $K(i)$ obtained from the actual data generated quantity $BIT_R$ of. the present frame may be set directly to the update value $K_X(i+1)$ used for quantizing the next frame so as to yield the same effect as that achieved in the previous case, wherein the proportional coefficient K is made appropriate for variations in the picture at the sub-regions RGS.

Figure 12:
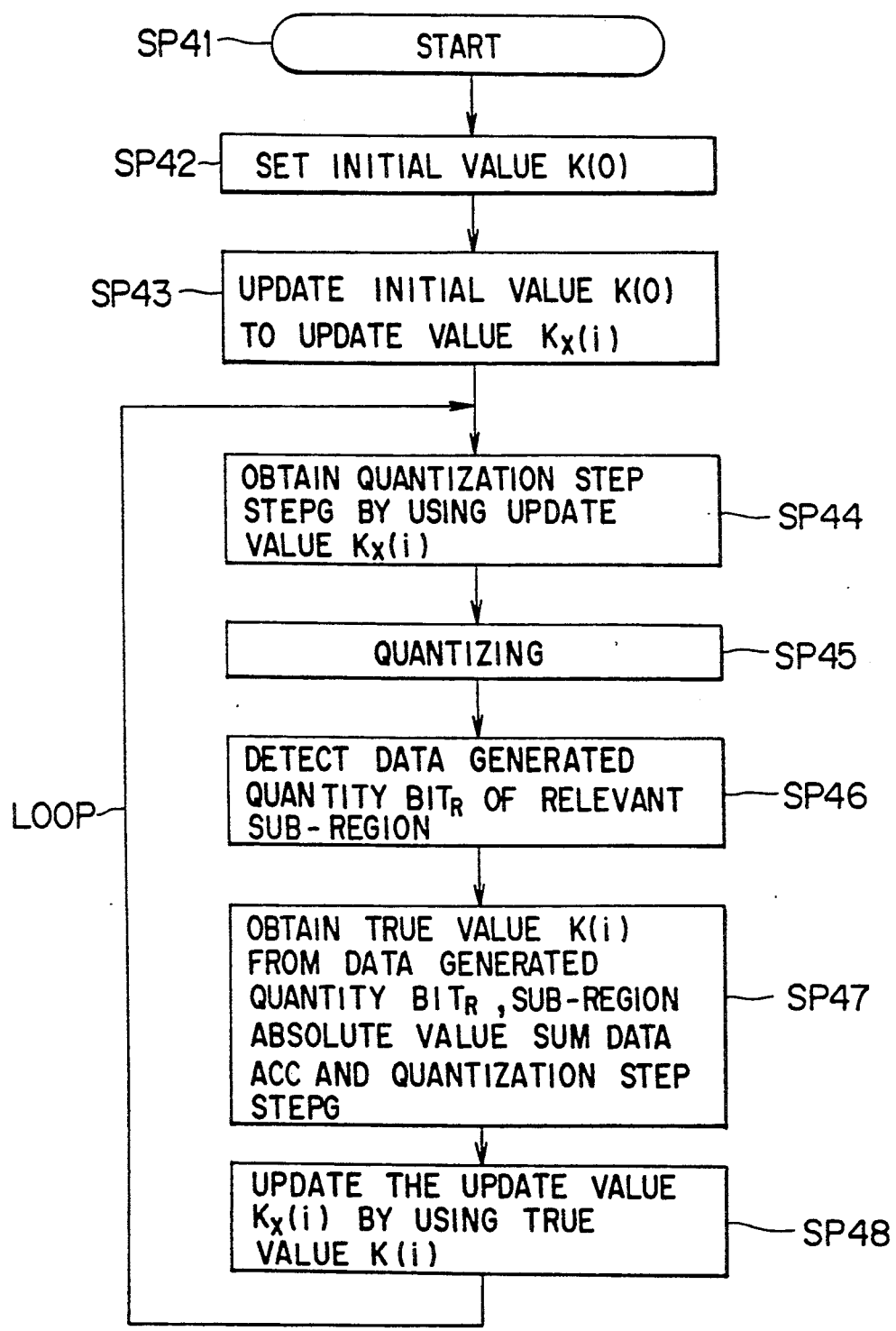

In the embodiment of the invention described with reference to FIGS. 6-8 and the modifications thereof other than that described with reference to FIG. 12, when obtaining the quantization step STEP G, the transmission coding circuit 15 executes the transform coding process by a transforming method that causes the data generated quantity to be proportional to $[\Sigma_{RGSX} |\text{Objective Data}| / \text{Quantization Step}]$. However, the same effect as that described above as resulting from the proportional coefficient K can be achieved by employing a transform coding circuit 15 which uses a transforming method expressible by a predetermined approximate expression.

By way of summary, it is to be noted that, in the first embodiment of this invention described with references to FIGS. 6-8 and the various described modifications thereof, the quantization step for the frame to be transmitted is determined in dependence on a ratio of an amount of data to be transmitted to a previously allocated data transmission allowable quantity. With this arrangement, the picture quality of the transmission data can be made appropriate to the significant picture information quantity. Therefore, it is possible to easily attain video signal coding capable of effectively preventing the single picture from being partially deteriorated to an extreme degree, as is often the case with the prior art.

Referring again to FIG. 6 in which components corresponding to those described with reference to FIG. 4 are identified by the same reference numerals, it will further be seen that, on the basis of transmission data information S33 obtained from a motion detecting circuit 21, the data control circuit 31 quantizes a picture part of each frame to be transmitted by a quantization step STEP G corresponding to a significant picture information quantity, that is, a differential data quantity indicated by deviation data S14 obtained from a subtractor circuit 13, to be coded in accordance with quantization step calculating procedures shown in FIG. 14. The picture information of each picture part can thus be quantized by a quantization step STEP G corresponding to the nature of the information, thereby generating transmission data which is appropriate in terms of spectral luminous efficacy.

Figure 14:
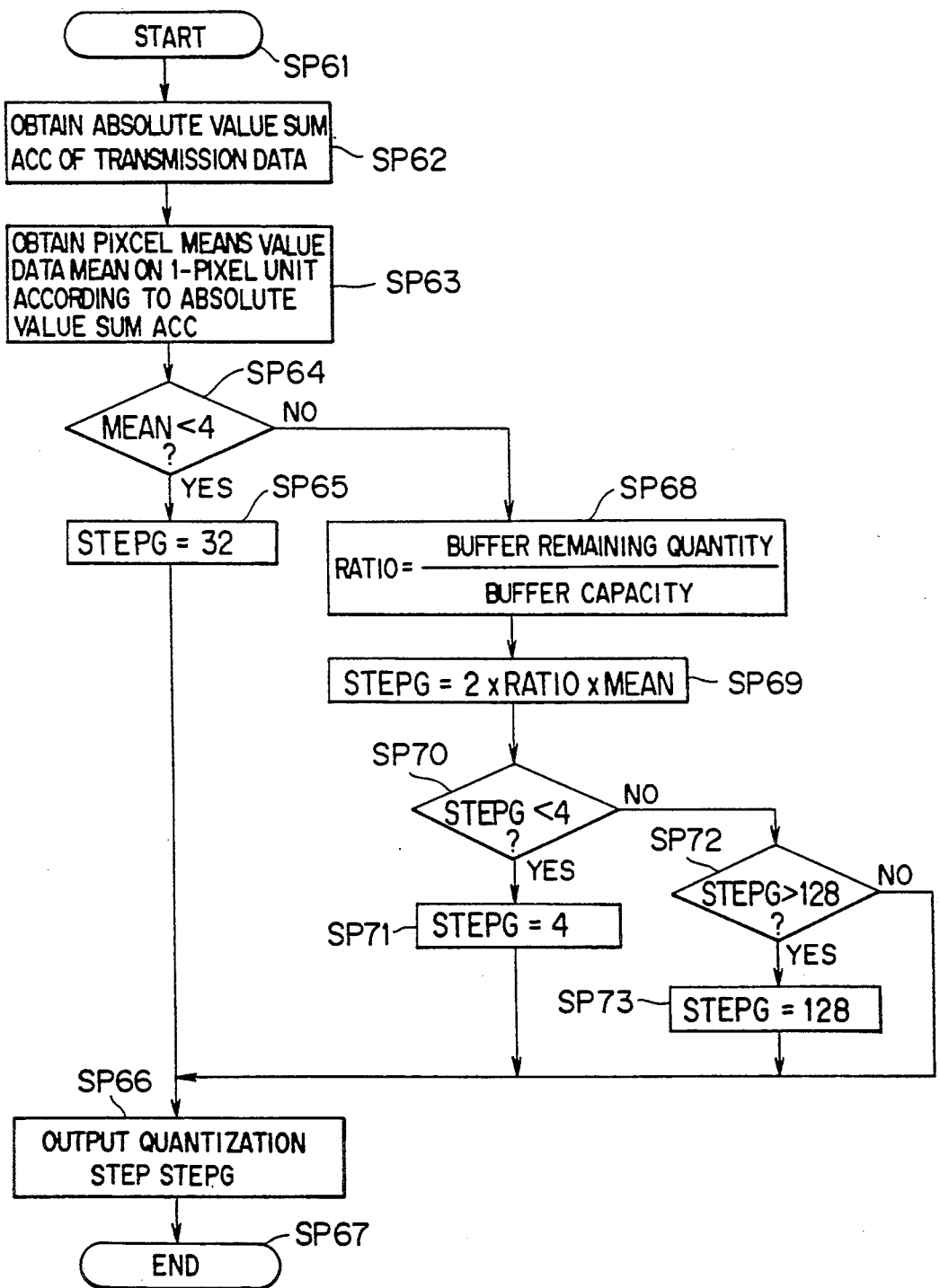
FIG. 14 is a flowchart showing steps of a video signal coding method according to a second embodiment of the invention.

In the quantization step calculating procedures of FIG. 14, the data control circuit 31 divides a main region RGM, for example, constituted by a 1-frame picture, into sub-regions RGS each consisting of 16 pixels × 16 pixels forming a transmission unit block. The circuit 31 then quantizes, to transmission data, respective pixel data DATA constituting significant picture information of the sub-regions RGS, which information is to be coded.

To be more specific, after the data control circuit 31 enters the quantization step calculating procedures of FIG. 14 at a step SP61, an absolute value sum ACC of transmission data DATA for each transmission unit block, for example, for each of the sub-regions RGS, is calculated in a step SP62, as follows:

$$ACC = \Sigma_{RGS} |\text{DATA}| \qquad (24)$$

Thereafter, at a step SP63, a mean value arithmetic operation is executed as follows:

$$MEAN = \frac{ACC}{16 \times 16} \qquad (25)$$

The pixel mean value data MEAN for a one-pixel unit is thus obtained on the basis of the absolute value sum ACC.

The one frame picture data represents a distribution of significant picture information quantities according to each transmission unit block, that is, individual sub-regions RGS. It is also feasible to know the state where the distribution of the significant picture information is obtained as one-pixel unit data.

In this state, the data control circuit 31 moves to a step SP64 in which the relation of the pixel mean value data MEAN to a first estimation reference value EST1 is determined.

The first estimation reference value EST1 is set as follows:

$$EST1 = 4 \qquad (26)$$

With the value [4] as the first estimation reference value EST1, it is judged in the step SP64 whether or not the pixel mean value data MEAN is smaller than the first estimation reference value EST1 = 4.

The value [4] to which the first estimation reference value EST1 is set, may be considered to correspond to a noise level. If the answer is affirmative at step SP64, this implies that no significant picture information to be transmitted is present in the sub-regions RGS, and that any variations that may be seen in the pixel data DATA can be considered to be noises. In response to such affirmative answer in step SP64, the data control circuit 31 shifts to a step SP65 in which quantization step STEP G is set to a numerical value, for example, [32], which is remarkably greater than the noise level.

In the next step SP66, $$STEP \ G = 32 \qquad (27)$$

is outputted as a quantization step control signal S31 to the quantization circuit 16. Thereafter, the quantization step calculating procedures come to an end at a step SP67.

By setting the quantization step G to a value greater than the noise level, it can be ensured that, for any transmission unit block in which the pixel mean value data MEAN contains pixel data DATA of the noise level, the data control circuit 31 establishes a state in which the data is not allowed to be transmitted as the quantization data S16 from the quantization circuit 16. In such state, data of numerical value [0] is transmitted.

If a negative answer is obtained at step SP64, this indicates that significant picture information to be transmitted exists in the transmission unit block and, in response thereto, the data control circuit 31 moves to a step SP68 in which a buffer remaining quantity ratio RATIO is determined by the following formula.

$$\text{RATIO} = \frac{\text{Buffer Remaining quantity}}{\text{Buffer Capacity}} \quad (28)$$

The routine being executed by circuit 31 then moves to a step SP69 in which the quantization step STEP G is obtained as follows:

$$\text{STEP G} = 2 \times \text{RATIO} \times \text{MEAN} \quad (29)$$

In the formula (29), the pixel mean value data MEAN represents a level, corresponding to a so-called direct-current-like data quantity, which represents the significant picture information quantity of the transmission unit block which is going to be quantized. On the other hand, the buffer remaining quantity ratio RATIO represents a degree of allowance when supplying the transmission picture data S20 to the transmission buffer memory 3. The numerical value [2] in formula (29) represents a proportional coefficient.

The quantization step STEP G obtained by formula (29) is a value with which a data processing capability (or a degree of allowance for data processing) in the transmission buffer memory 3 is weighted to the significant picture information quantity to be transmitted in the transmission unit block which is now going to be transmitted.

The quantization step STEP G is variably controlled to a larger or smaller value so as to quantize a picture part in which the pixel mean value data MEAN is large or small, respectively, due to a large or small quantity of picture information in the respective transmission unit block. As a result, the quantization circuit 16 executes coarse or fine quantization. During such control of the quantization step STEP G, if the quantity of data remaining in the transmission buffer memory 3 goes on incrementing or decrementing, the buffer remaining quantity ratio RATIO increases or decreases correspondingly. In response to the foregoing, the quantization step STEP G is variably controlled to a larger or smaller value, whereby the quantization circuit 16 executes coarse or fine quantization.

At this stage, in a step SP70, the data control circuit 31 judges whether or not the quantization step STEP G obtained in formula (29) is smaller than a second estimation reference value EST2 which is set as follows:

$$\text{EST2} = 4 \quad (30)$$

The second estimation reference value EST2 is set to such a lower limit value so that the value of the step STEP G is not allowed to decrease indefinitely. If the answer is affirmative at step SP70, the data control circuit 31 proceeds to a step SP71, wherein the quantization step STEP G is set to a lower limit value, such as, $$\text{STEP G} = 4 \quad (31)$$

Consequently a state is developed in which the data generated quantity cannot become excessive. After step SP71, the quantization step calculating procedure is terminated through steps SP66 and SP67.

If a negative answer is obtained at step SP70, the routine proceeds to a step SP72 in which the data control circuit 31 judges whether or not the quantization step STEP G is greater than a third estimation reference value EST3 which may be set as follows:

$$\text{EST3} = 128 \quad (32)$$

The third estimation reference value EST3 is set to such an upper limit value so that the value of the step STEP G is not allowed to increase indefinitely. If the answer is affirmative at step SP72, the data control circuit 31 sets the quantization step STEP G to the upper limit value [128] at a step SP73, thereby ensuring that the data generated quantity cannot be abnormally reduced in the quantization circuit 16. Thereafter, the quantization step calculating procedure is terminated through the steps SP66 and SP67.

On the other hand, if a negative answer is obtained at the step SP72, this implies that there is no abnormality either in the buffer remaining quantity of the transmission buffer memory 3 or in the significant picture information quantity of the transmission unit block which is about to undergo quantization. Therefore, in response to a negative answer at step SP72, the data control circuit 31 finishes the quantization step calculating procedure through the steps SP66 and SP67 with the quantization step STEP G having a value determined by formula (29) at step SP69.

Based on the arrangement discussed above, in a normal operating state the data control circuit 31 increases the quantization step STEP G when the significant picture information quantity of the transmission unit block which is to be processed is larger. The data generated quantity is thereby restrained to a smaller value. When a video signal is received having a significant picture information quantity large enough to make a person unable to perceive deterioration of the picture quality in conformity with Weber's law and the masking effect provided by the human visual sense, the data generated quality in the video signal is sufficiently restrained to correspondingly thereby enhance transmission efficiency of the data.

On the other hand, when quantizing a video signal part having a significant picture information quantity, that is, small enough so that deterioration of the picture quality is clearly perceived by the human visual sense, in conformity with Weber's law and the masking effect, the data generated quantity can be incremented by reducing the quantization step STEP G. It is therefore feasible to generate picture data exhibiting good picture quality.

Therefore, transmission data which presents a much higher picture quality, in terms of the human visual sense on the whole, can thus be generated with high efficiency.

In the procedures described above with reference to FIG. 14, inter-pixel differential data adjacent to the intra-frame coded data are used. However, the same effects can be obtained by making use of a variety of other coding methods for instance, by coding a differential signal (AC component) from a mean value (DC component) in the form of transmission data.

Further, in the procedure described with reference to FIG. 14, the absolute value sum ACC of each pixel data is used when seeking the pixel mean value data MEAN for the respective transmission unit block. However, the same effects can be achieved by using a power or a maximum value or dynamic range.

Where the transform coding circuit 15 involves the use of a discrete cosine transform circuit, an information quantity to be coded, that is, the pixel mean value data MEAN, may be determined by a discrete transform coefficient.

Furthermore, in the procedure described with reference to FIG. 14, the least value of the quantization step STEP G is set to a numerical value [4]. However, this value may be determined in dependence on the degree to which a dynamic range produced when effecting transform-coding in the transform coding circuit 15 is expanded. For example, where a discrete cosine transform circuit is employed as the transform coding circuit 15, the dynamic range is expanded by a factor of 8 with respect to the input signal. Hence, the least value of the quantization step may be set to a value from 4 through 8. Moreover, the maximum value of the quantization step STEP G can be practically set to value from approximately 46 through 128 depending on the capacity of the transmission buffer memory 3 or the control velocity.

By way of summary, it will be noted that, by the procedures described with reference to FIG. 14 and the modifications thereof noted above, when the picture information quantity to be coded increases, the quantization step is correspondingly increased. With such arrangement, it is possible to easily generate the transmission data so as to have the following characteristics: The data part in which deterioration of the picture quality is perceivable by the human visual sense can be transmitted with a high picture quality, whereas the picture part in which the deterioration of the picture quality is not perceivable can be transmitted with a relatively low picture quality.

Figure 15A:
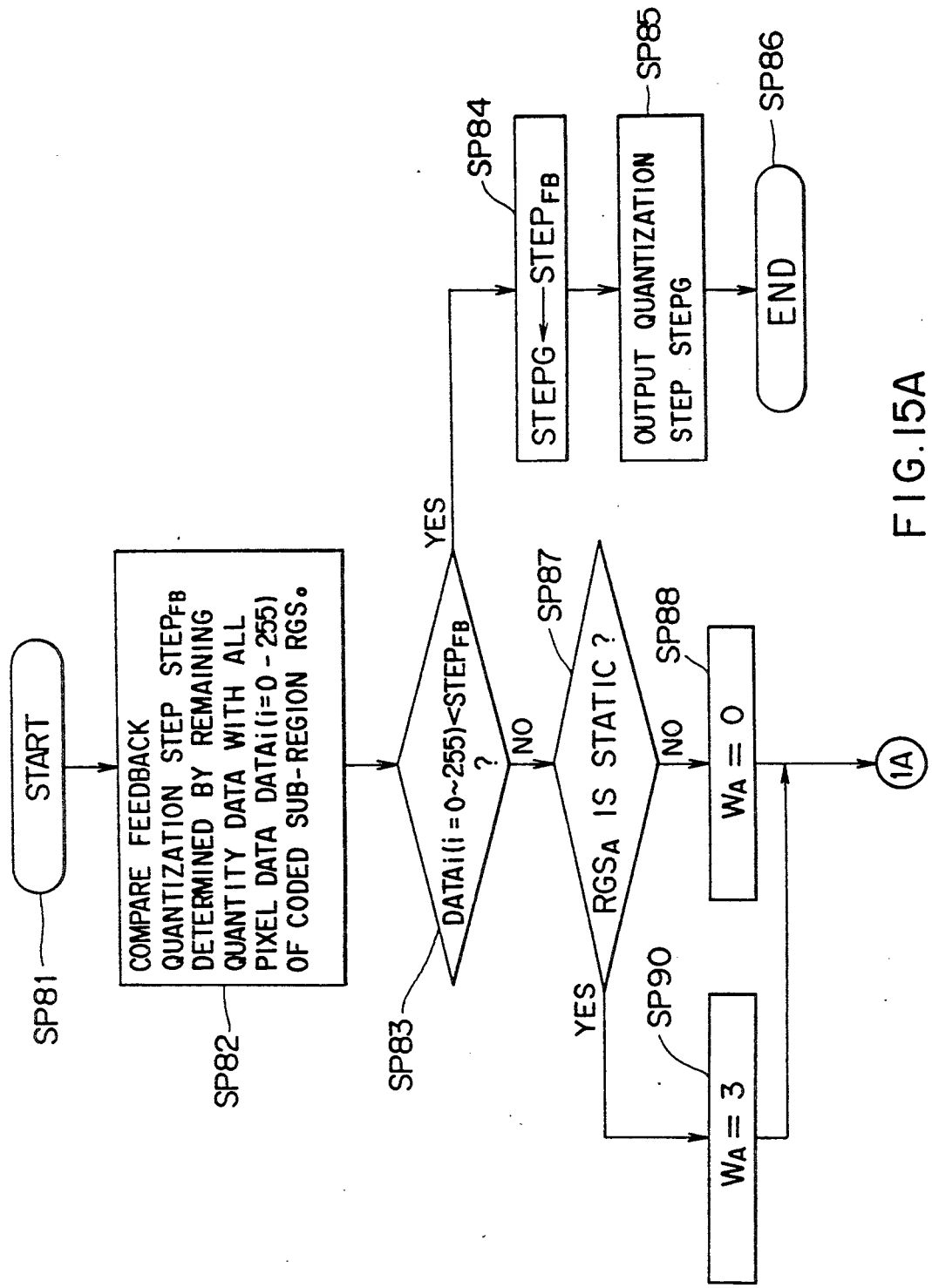
FIGS. 15A, 15B and 16 are flowcharts showing steps of a video signal coding method according to a third embodiment of the invention.
Figure 15B:
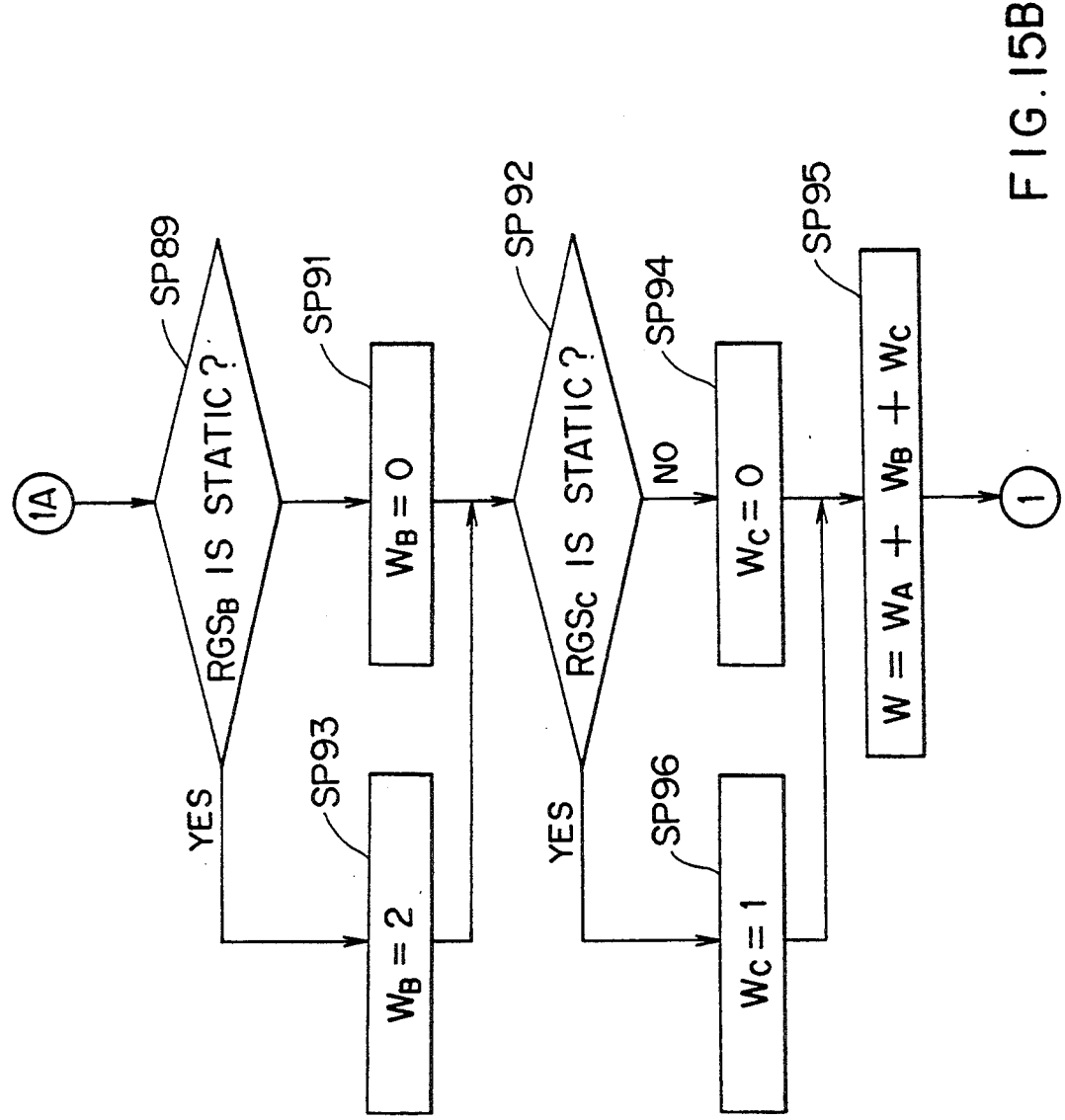
Figure 16:
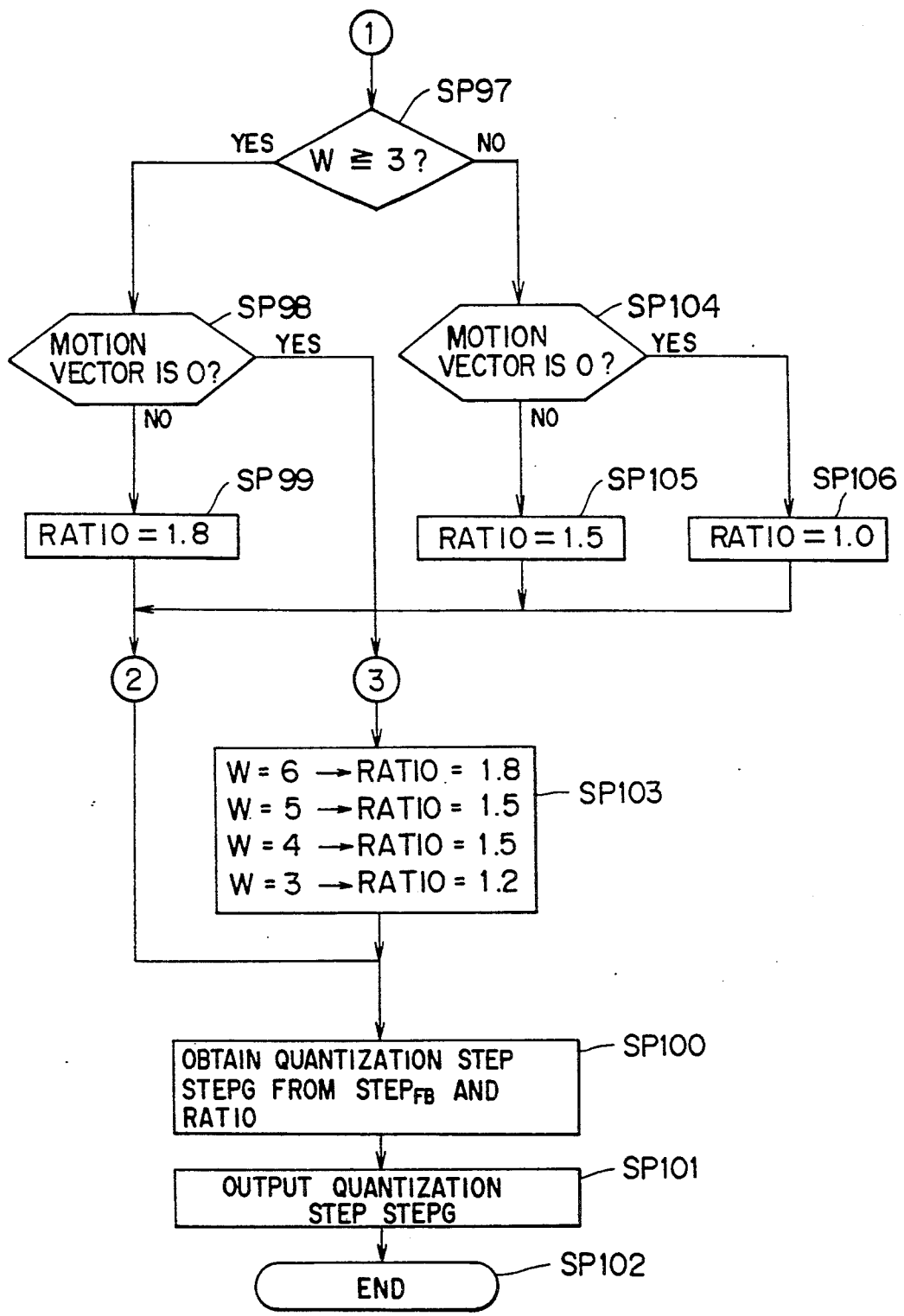

Referring now to FIGS. 15 and 16, it will be seen that, in a method in accordance with another embodiment of this invention which employs the arrangement shown on FIG. 6, the data control circuit 31 calculates the quantization step STEP G in quantization step calculating procedures making use of transmission data information S33 imparted from a motion detecting circuit 21 and a remaining quantity data signal S25 from the transmission buffer memory 3 (FIG. 6). The circuit 3 then transmits this signal as a quantization step control signal S31.

Figures 17, 23:
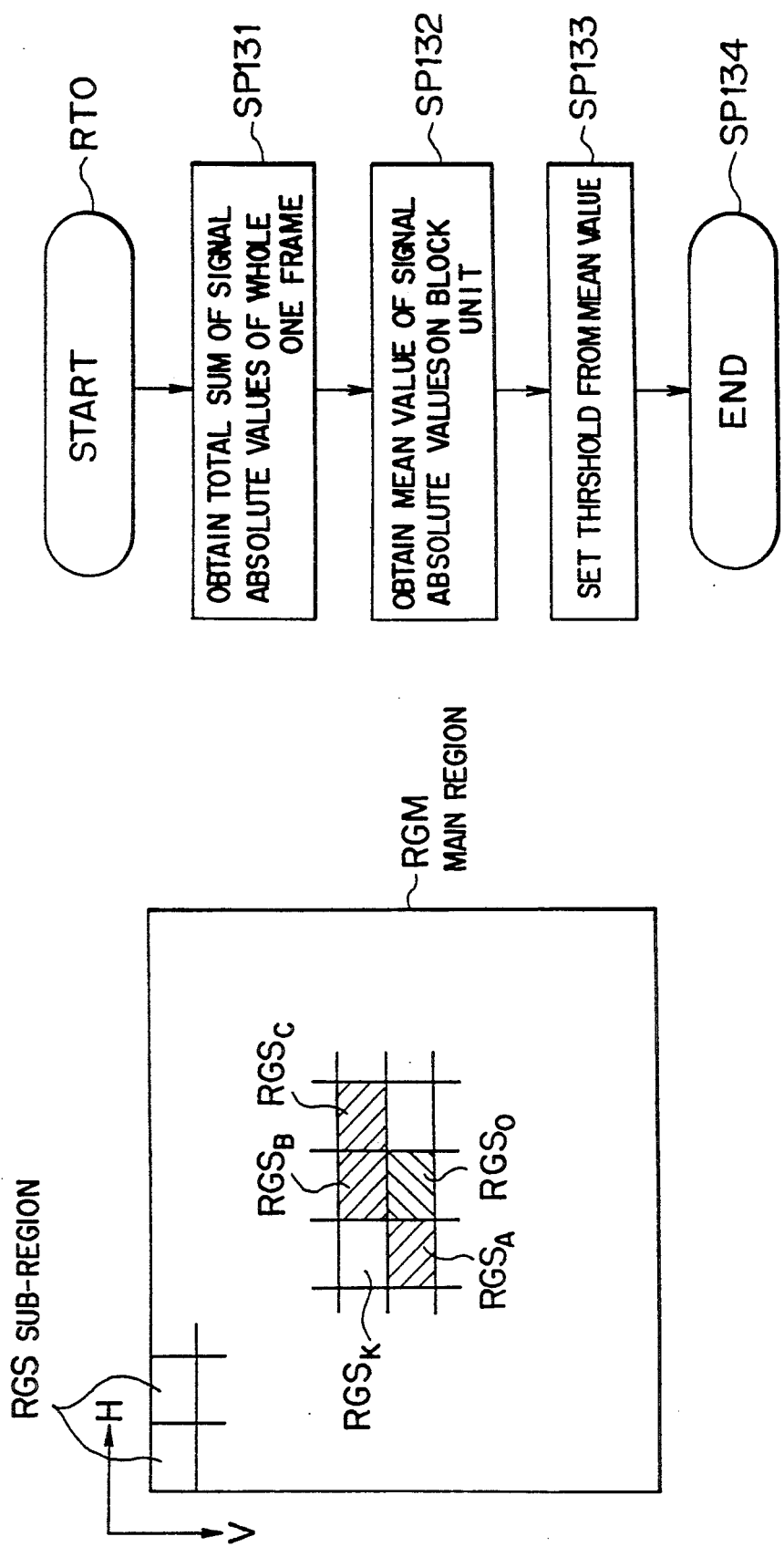
FIG. 17 is a schematic diagram to which reference will be made in explaining a method of detecting the content of picture information.
FIGS. 23 and 24 are flowcharts showing operations of a weighting control circuit included in the system of FIG. 21.

In the quantization step calculating procedures shown in FIGS. 15 and 16, the data control circuit 31 divides a main region RGM, for example, serving as a 1-frame picture, into sub-regions RGS (FIG. 17) each consisting of a 16 pixels×16 pixels transmission unit block. The circuit 31 then quantizes, to transmission data, respective pixel data DATA constituting significant picture information, of the sub-regions RGS, and which is to be coded.

More specifically, the data control circuit 31 enters the quantization step calculating procedures at a step SP81, and then, at a step SP82, compares a feedback quantization step $STEP_{FB}$ and all of pixel data DATAi (i=0–255) of the coded sub-region $RGS_0$. The feedback quantization step$_{FB}$ is determined from the remaining quantity data signal S25 associated with the transmission buffer memory 3. Subsequently, at a step SP83, data control circuit 31 judges whether or not each of the pixel data DATAi (i=0–225) is smaller than the feedback quantization step $STEP_{FB}$.

If the answer at step SP83 is affirmative, this implies that there is no motion, that is, significant picture information of a main region RGM constituting the present frame is virtually at a level of numerical value [0], and the data control circuit 31 moves to a step SP84, wherein the feedback quantization step $STEP_{FB}$ is replaced with a quantization step STEP G. Thereafter, at a step SP85, the data control circuit 31 transmits the quantization step STEP G to the quantization circuit 16, and the quantization step calculating procedures are then finished at a step SP86.

As a matter of fact, when the data control circuit 31 executes the steps SP84, SP85 and SP86, as described above, the transform coding signal S15 supplied to the quantization circuit 16 from the transform coding circuit 15 assumes the level of numerical value [0] corresponding to a noise level. As a result, the quantization circuit 16 transmits data of numerical value [0] as quantization data S16, and eventually the circuit 16 is controlled to assume a state in which no data to be transmitted is generated.

On the other hand, if a negative answer is obtained at step SP83, this indicates that there is significant picture information to be transmitted in respect to any one of the sub-regions, and, in response to such negative answer, the data control circuit 31 shifts to a step SP87 for initiating a process to calculate the quantization step STEP G to be used for quantization of the significant picture information.

A value of the quantization step STEP G for the coded sub-regions RGS is determined in accordance with a relationship between the significant picture information of the sub-regions adjacent to the coded sub-region $RGS_0$.

More specifically, at the step SP87, the data control circuit 31 judges whether the significant picture information is static or not, that is, whether or not there is a variation when comparing the picture information of the adjacent sub-region $RGS_A$ in the preframe with respect to the corresponding adjacent sub-region $RGS_A$ (FIG. 17) disposed one such sub-region before, in the H− or horizontal-scanning direction, the coded sub-region $RGS_0$.

If the answer is negative at step SP87, this implies that some motion can be seen in the adjacent sub-region $RGS_A$, and, in response thereto, the data control circuit 31 moves to a step SP88, wherein static ratio data $W_A$ is set to a value [0]. After this, the circuit 31 shifts to a step SP89.

If an affirmative answer is obtained at step SP87, the data control circuit 31 sets the static ratio data $W_A$ to a value [3] at a step SP90 and then moves to the step SP89.

At the step SP89, the data control circuit 31 judges whether the significant picture information is static or not with respect to an adjacent sub-region $RGS_B$ (FIG. 17) disposed one such sub-region before, in the V- or vertical scanning direction, the coded sub-region $RGS_0$ by making a comparison with the sub-region $RGS_B$ in the preframe. If the answer is negative at the step SP89, the data control circuit 31 moves to a step SP91 at which it sets the static ratio data $W_B$ of the adjacent sub-region $RGS_B$ to a value [0] and then moves to a step SP92. On the other hand, if an affirmative answer is obtained at the step SP89, the data control circuit 31 sets the static ratio data $W_B$ to a value [2] at a step SP93 and then shifts to the step SP92.

At the step SP92, the data control circuit 31 judges whether or not a change can be seen in the significant picture information with respect to a sub-region $RGS_0$ (FIG. 17) which is adjacent to the coded sub-region $RGS_0$ in an obliquely upper rightward direction so as to be disposed one sub-region behind, in the H— or horizontal scanning direction, the adjacent sub-region $RGS_B$. If the answer is negative at the step SP92, the circuit 31 sets the static ratio data $W_C$ to a value [0] at a step SP94 and moves to the next step SP95. On the other hand, if an affirmative answer is obtained at the step SP92, the circuit 31 sets the static ratio data $W_C$ to a value [1] at a step SP96 and then moves to the step SP95.

Thus, in the steps SP87 to SP95, the data control circuit 31 detects variations in the significant picture information with respect to the adjacent sub-regions $RGS_A$, $RGS_B$ and $RGS_C$ which are all contiguous to the coded sub-region $RGS_0$. If variations are detected, the value [0] is given to each of the static ratio data $W_A$, $W_B$ and $W_C$. Whereas, if no variations are present, the numerical values [3], [2] and [1] are given to the static ratio data $W_A$, $W_B$ and $W_C$, respectively, as shown in the following formulas:

$$W_A = 3 \tag{33}$$

$$W_B = 2 \tag{34}$$

$$W_C = 1 \tag{35}$$

The weighting processes at the steps SP90, SP93 and SP96 represent degrees to which static states, where the adjacent sub-regions $RGS_A$, $RGS_B$ and $RGS_C$ are static, exert influences on the significant picture information of the coded sub-region $RGS_0$.

More specifically, weighting or giving the value [3] to the static ratio data $W_A$ of the adjacent sub-region $RGS_A$ at the step SP90 implies that a relative variation in the picture information of the coded sub-region $RGS_0$ in the H-direction is obtained from the significant picture information of the single adjacent sub-region $RGS_A$.

The reasons for giving the numerical values [2] and [1] to the V-directionally adjacent sub-regions $RGS_B$ and $RGS_C$ at the steps SP93 and SP96, respectively, will now be explained. Firstly, the significant picture information exerting an influence in the V-direction on the significant picture information of the coded sub-region $RGS_0$ is conceived of as pieces of information of the adjacent sub-regions $RGS_B$ and $RGS_C$. The influences of these two adjacent sub-regions $RGS_B$ and $RGS_C$ may be considered to be substantially equal to the influence of the adjacent sub-region $RGS_A$ in the horizontal direction. Hence, the value of the sum of the static ratio data $W_B$ and $W_C$ may be selectively set to be equal to the value of the static ratio data $W_A$, that is, [2]+[1]=[3].

Secondly, the distance between the coded sub-region $RGS_0$ and the adjacent sub-region $RGS_B$ is shorter than that between the coded sub-region $RGS_0$ and the adjacent sub-region $RGS_C$. Thus, it may be assumed that the magnitude of the influence received by the coded sub-region $RGS_0$ from the adjacent sub-region $RGS_B$ will be larger than from the sub-region $RGS_C$. Therefore, the values or weights [2] and [1] are given to the V-directionally adjacent sub-regions $RGS_B$ and $RGS_C$.

After finishing the above-described processes at the step SP95, the data control circuit 31 obtains the static ratio data W indicating the total degree of influences on the coded sub-region $RGS_0$ from the three adjacent sub-regions $RGS_A$, $RGS_B$ and $RGS_C$ by adding the respective static ratio data $W_A$, $W_B$ and $W_C$. The relationship therebetween is expressed as:

$$W = W_A + W_B + W_C \tag{36}$$

Subsequently, in a routine shown on FIG. 16, the data control circuit 31 executes a process for calculating a feedback quantization step transform data RATIO on the basis of the static ratio data W.

More specifically, at a step SP97, the data control circuit 31 judges whether or not the static ratio data W is equal to or greater than [3]. If the answer is affirmative at step SP97, that is, W is at least [3], the circuit 31 moves to a step SP98 at which it determines whether or not a motion vector of the coded sub-region $RGS_0$ is [0], that is, whether or not there is a picture motion at the coded sub-region $RGS_0$.

If the answer is NO at step SP98, this indicates that, with little or no variations or motions appearing in the adjacent sub-regions $RGS_A$, $RGS_B$ and $RGS_C$, there is also no picture motion in the coded sub-region $RGS_0$. In response to a NO answer at the step SP98, the data control circuit 31 sets the feedback quantization step transform ratio data RATIO to its greatest value [1.8] at a step SP99. Thereafter, at a step SP100, the circuit 31 calculates a value of the quantization step STEPG by dividing the feedback quantization step $STEP_{FB}$ by the feedback quantization step transform ratio data RATIO, as follows:

$$STEPG = \frac{STEP_{FB}}{RATIO} \tag{37}$$

At the next step SP101, the data control circuit 31 outputs the thus calculated quantization step STEP G as a quantization control signal S31 applied to the quantization circuit 16. Then, the quantization step calculating procedure comes to an end at a step SP102.

In consequence of the foregoing, the quantization circuit 16 quantizes a picture boundary existing in the coded sub-region $RGS_0$ by providing the quantization step STEPG with its least or smallest value. Thus, the picture information corresponding to that boundary undergoes very fine quantization. Hence, the picture of the boundary which is visually conspicuous can be quantized to transmission data exhibiting high picture quality.

On the other hand, if the answer is YES at the step SP98, this means that, the significant picture information of the adjacent sub-region $RGS_A$, $RGS_B$ and $RGS_C$ are static or involve only small variations, at the same time that a picture is produced with motion in the coded sub-region $RGS_0$. More specifically, in response to a YES answer at the step SP98, the data control circuit 31 is operative at a step SP103 to set the feedback quantization step transform ratio data RATIO to a value corresponding to the actual variations if any in the significant picture information of the adjacent sub-regions $RGS_A$, $RGS_B$ and $RGS_C$. At the completion of the step SP103, the data control circuit 31 executes the step SP100 for the arithmetic calculation of the quantization step STEPG.

In the example being described, when the static ratio data W is a value [6], which value implies that there is no variation in the picture information of all the adjacent sub-regions $RGS_A$, $RGS_B$ and $RGS_C$, the data control circuit 31 is operative at the step SP103 to set the feedback quantization step transform ratio data RATIO to the greater value [1.8]. As a result of the foregoing, the quantization circuit 16 executes fine quantization of the coded sub-region $RGS_0$ when no picture variation is present in the adjacent sub-regions $RGS_A$, $RGS_B$ and $RGS_C$, and picture motion occurs in the coded sub-region $RGS_0$.

When the static ratio data W is [5] or [4], which value indicates that no picture variation can be seen in the adjacent sub-region $RGS_A$ and in one or the other of the sub-regions $RGS_B$ and $RGS_C$, the data control circuit 31 sets the feedback quantization step transform ratio data RATIO to a slightly smaller value [1.5]. Thus, the quantization circuit 16 executes a slightly rougher quantization of such picture in which picture variation appears in a part of the picture contiguous to the coded sub-region $RGS_0$.

When the static ratio data W is [3], which implies that only the adjacent sub-region $RGS_A$ is static, or alternatively only the sub-regions $RGS_B$ and $RGS_C$ are static, the feedback quantization step transform ratio data RATIO is set to an even smaller value [1.2]. In response thereto, the data control circuit 31 executes still rougher quantization of the coded sub-region $RGS_0$ by further incrementing the value of the quantization step STEPG.

If the answer is negative at step SP97, which means that the static ratio data W is less then [3], the routine proceeds to a step SP104 at which the data control circuit 31 judges whether or not the motion vector is [0].

If the answer is NO at the step SP104, this means that no picture movement is occurring in the coded sub-region $RGS_0$ while the static ratio data W is a value less than [3], which in turn, indicates that picture variation may be seen in at least the most influential adjacent sub-region $RGS_A$, while at most one of the adjacent sub-regions $RGS_B$ and $RGS_C$ is static. In response to the NO answer at the step SP104, the data control circuit 31 sets the feedback quantization step transform ratio data RATIO to an intermediate value [1.5] at a step SP105. After this step SP105, the circuit 31 executes the arithmetic operation of step SP100 so as to obtain the quantization step STEPG.

Since a picture variation is present in the adjacent sub-region $RGS_A$ contiguous to the static coded sub-region $RGS_0$ in the H-direction, it follows that a boundary of the picture information exists in the coded sub-region $RGS_0$. For this reason, the data control circuit 31 executes slightly rough quantization of the coded sub-region $RGS_0$, thereby generating transmission data, which is compressed only to a degree which avoids deterioration of the picture quality.

If the answer is YES at the step SP104, this indicates that, while the pictures of the adjacent sub-regions $RGS_A$, $RGS_B$ and $RGS_C$ are undergoing change, the picture of the coded sub-region $RGS_0$ also simultaneously moves. Thus, in response to a YES answer at the step SP104, the data control circuit 31 is operative at a step SP106 to set the feedback quantization step transform ratio data RATIO to a value [1.0] so that no transformation is performed with respect to the feedback quantization step. The control circuit 31 then correspondingly computes the quantization step STEPG at the step SP100.

Thus, the data control circuit 31 causes the quantization circuit 16 to effect rough quantization by using the feedback quantization step $STEP_{FB}$ as it is, that is, without scale-down-transforming of this feedback quantization step, when a picture, which moves together with the adjacent sub-regions $RGS_A$, $RGS_B$ and $RGS_C$, is present in the coded sub-region $RGS_0$. AS a result, the circuit 31 carries out the control so as to restrain the data generated quantity associated with a motion picture of low spectral luminous efficacy.

By way of summary, it will be appreciated that, in the described arrangement of FIGS. 15 and 16, when quantizing the significant picture information of the coded sub-regions $RGS_0$, a judgement is made as to the nature of the variations of the pictures in the adjacent sub-regions $RGS_A$, $RGS_B$ and $RGS_C$, and the value of the quantization step STEPG is selected in accordance with the relative variations or motions between each coded sub-region and the adjacent sub-regions in accordance with whether or not motion can be seen in the coded sub-region $RGS_0$. This enables the control of the quantization step to be adjusted to the content of the picture information in each part in the main region RGM. Therefore, it is possible to generate transmission data of much higher picture quality than has been possible in the prior art.

Figure 18:
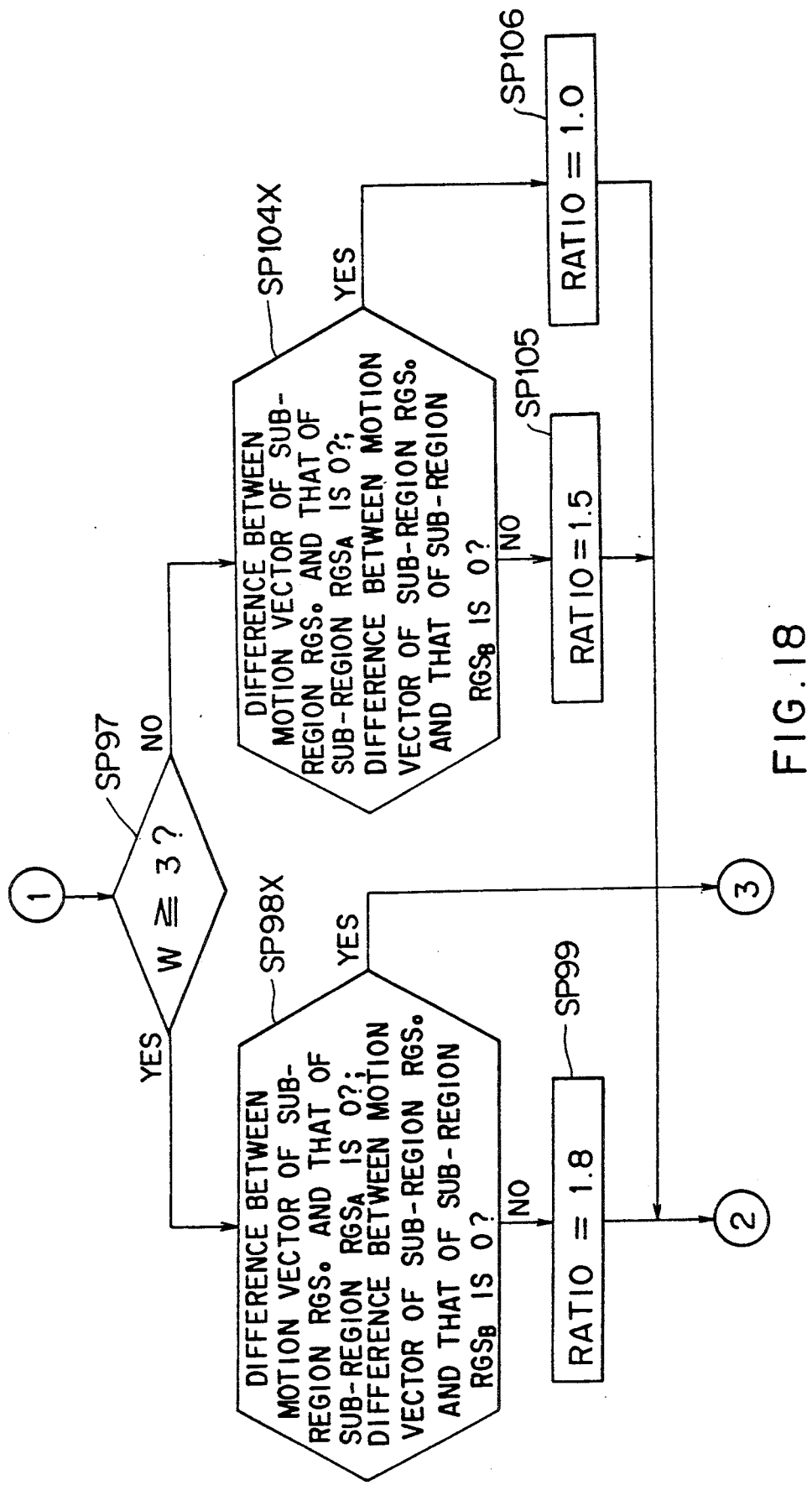
FIG. 18 is a flowchart showing a modification of the third embodiment of the invention.

Turning now to FIG. 18, there is shown a modification of the embodiment of the invention described above with reference to FIGS. 15 and 16, and in which the data control circuit 31 carries out quantization step calculating procedures employing steps SP98X and SP104X in place of the steps SP98 and SP108 of FIG. 16.

In the routine of FIGS. 15 and 16, the data control circuit 31 decides whether or not motion appears in the coded sub-region $RGS_0$ on the basis of whether or not the motion vector associated with the coded sub-region $RGS_0$ is [0]. However, in the modification of FIG. 18, the data control circuit 31 judges whether or not a difference between the motion vector of the coded sub-region $RGS_O$ and that of the adjacent sub-region $RGS_A$ is [0], and further whether or not a difference between the motion vector of the coded sub-region $RGS_0$ and the adjacent sub-region $RGS_B$ is [0]).

More specifically, in the arrangement of FIG. 18, if a YES answer is obtained at the step SP97, that is, W is at least [3], the data control circuit 31 determines, in the step SP98X, whether or not the difference between the motion vectors of sub-regions $RGS_0$ and $RGS_A$ is [0] and the difference between the motion vectors of sub-regions $RGS_0$ and $RGS_B$ is also [0]. If a YES answer is obtained at the step SP98X, the routine followed by the data control circuit 31 proceeds to the step SP103 in FIG. 16. If a NO answer is obtained at the step SP98X, the routine proceeds to the step SP99.

On the other hand, if a NO answer is obtained at the step SP97 in FIG. 18, that is, W is less than [3], the data control circuit 31 determines, in the step SP104X, whether or not the difference between the motion vectors of sub-regions $RGS_0$ and $RGS_A$ is [0] and the difference between the motion vectors of the sub-regions $RGS_0$ and $RGS_B$ is also [0]. If a NO answer is obtained at the step SP104X, the routine of FIG. 18 advances to the step SP105, whereas, if a YES answer is obtained at the step SP104X, the routine proceeds to the step SP106. Thus, in the modification of FIG. 18, the quantization step STEPG used for the quantization is controlled in dependence on whether or not any motion of the significant picture information of the coded sub-region region $RGS_0$ is accompanied by corresponding motion of the significant picture information of the adjacent sub-regions $RGS_A$ and $RGS_B$. If there is an area in the motion picture where adjacent sub-regions exhibit different motions, the relevant boundary can be quantized by a fine quantization step. This, in turn, enables generation of transmission data having a picture quality better adapted to the content of the significant picture information.

In the embodiment of FIGS. 15 and 16, and in the modification thereof described above with reference to FIG. 18, in the course of the steps SP90, SP93 and SP96 (FIG. 15), static ratio data $W_A$, $W_B$ and $W_C$ having different weights or values are allocated to the adjacent sub-regions $RGS_A$, $RGS_B$ and $RGS_C$. However, substantially the same effects can be achieved by allocating the same weights to such adjacent sub-regions.

Further, in the arrangements of FIGS. 15 and 16 and FIG. 18, there is no detection of the correlation, if any, between the sub-region $RGS_K$ (FIG. 17), which is contiguous to the adjacent sub-regions $RGS_A$ and $RGS_B$, and the coded sub-region $RGS_0$. However the static ratio data W may also be obtained with respect to variations in the adjacent sub-regions including the sub-region $RGS_K$.

Still another embodiment of the invention employs the picture data generating system of FIG. 6 in which a data control circuit 31 detects the nature of the picture data to be transmitted on the basis of transmission data information S33 from the motion detecting circuit 21. On the basis of such information S33, the data control circuit 31 executes quantization step calculating procedures shown in FIG. 19 for obtaining a quantization step control signal S31 which varies corresponding to the nature of the significant picture information to be transmitted, and which is supplied to the quantization circuit 16. In the embodiment to be described with reference to FIG. 19, a main region RGM is allocated to 1-frame picture data (FIG. 20) with respect to present frame data S12 generated from the present frame memory 12 (FIG. 6). Simultaneously, the data control circuit 31 allocates a sub-region $RGS_K$ (FIG. 20), for example, one sub-region for each transmission unit block data. Consequently, the data control circuit 31 estimates the nature of each picture part by detecting variations in the picture information quantity of the sub-region $RGS_K$ with respect to the 1-frame picture constituting the main region RGM.

In other words, when the sub-region in an arbitrary position within the main region RGM is specified as a coded picture region and the transmission unit block data thereof is to be quantized, the quantization step STEP G used for quantizing a coded sub-region $RGS_0$ is determined in accordance with the magnitude of a differential data quantity. The determination of the quantization step STEPG generally involves the steps of: extracting differential data of the maximum value from differences in significant picture information quantity between the coded sub-region $RGS_0$ and 8 adjacent sub-regions $RGS_K$ (K=1 through 8) which surround the coded sub-region $RGS_0$; and judging the differential data as variations in the nature of the pictures between the coded sub-region $RGS_0$ and the adjacent sub-regions $RGS_K$ (K=1 through 8).

Figure 19A:
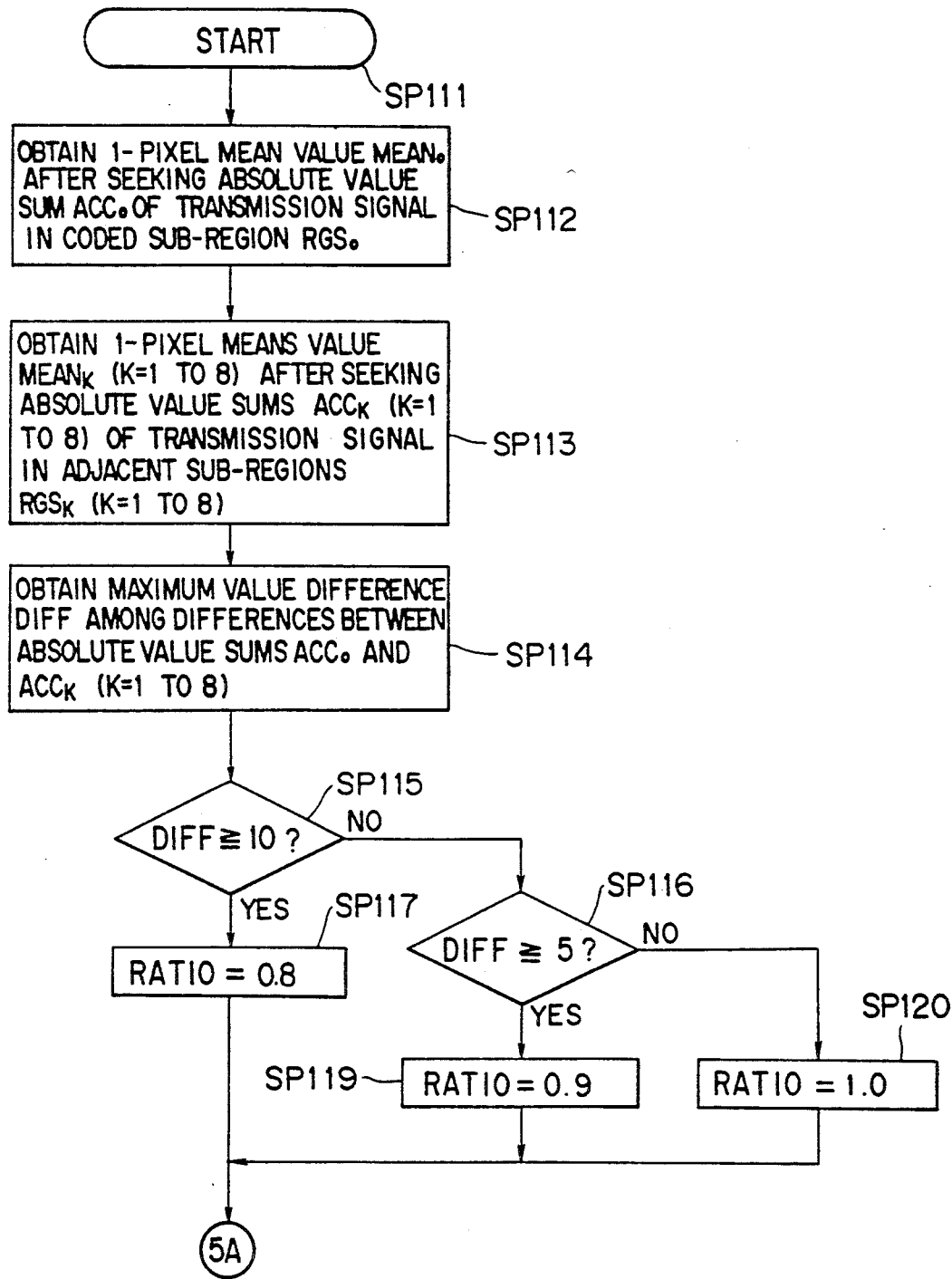
FIGS. 19A and 19B are flowcharts showing quantization step calculating procedures in a video signal coding method according to a fourth embodiment of this invention.
Figure 19B:
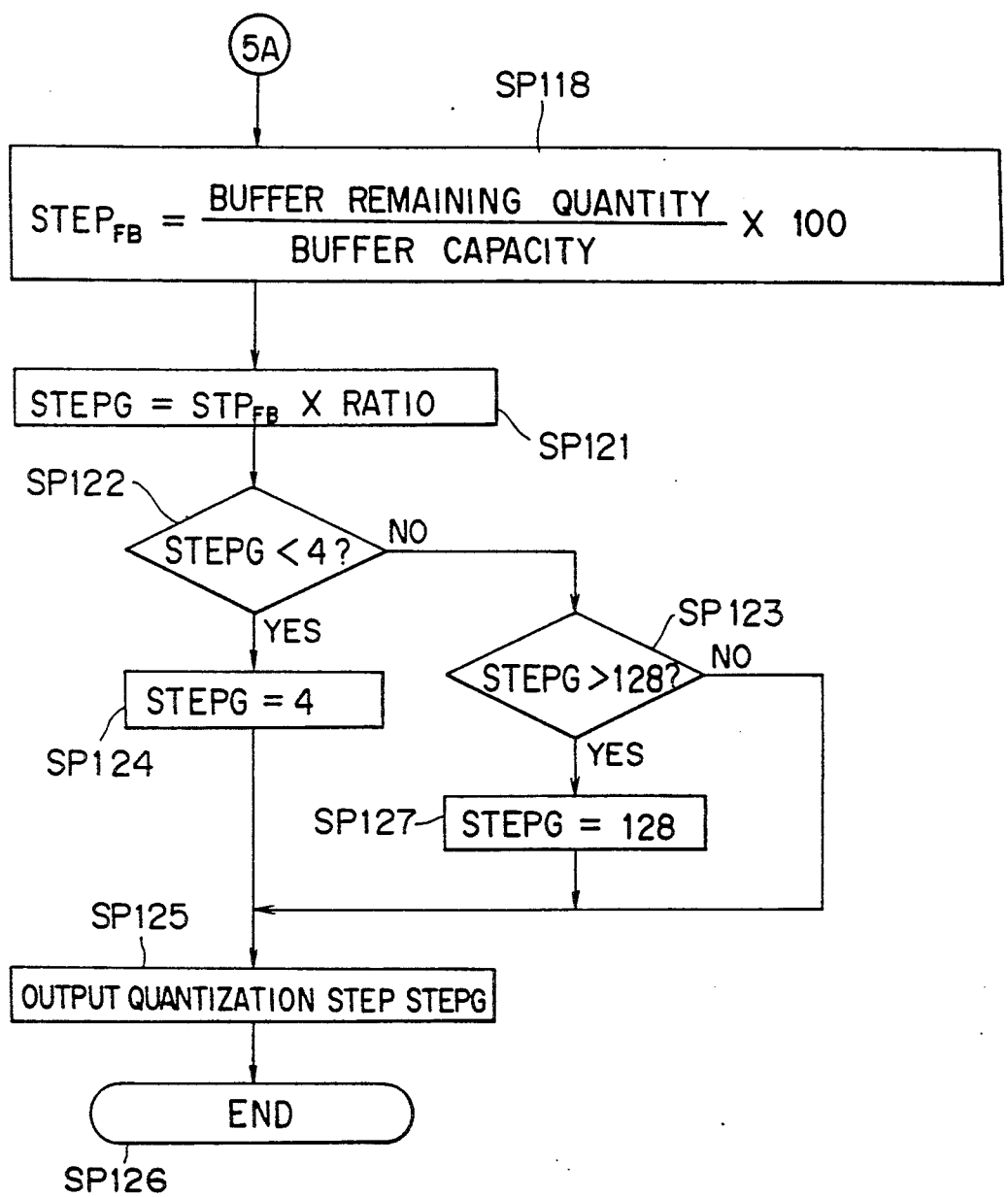
Figure 20:
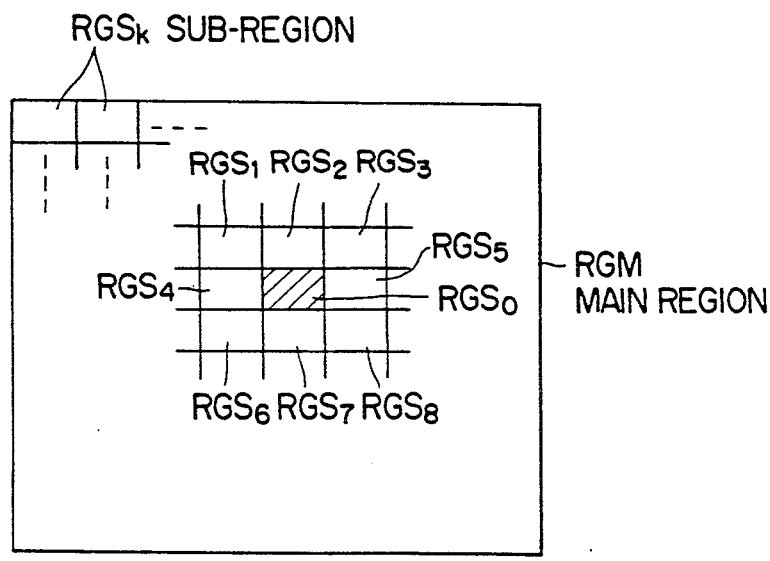
FIG. 20 is a schematic diagram to which reference will be made in explaining a coded sub-region and adjacent sub-regions.

As shown in detail in FIG. 19, upon entering the quantization step calculating procedures or routine at a step SP111, the data control circuit 31 calculates, at a step SP112, an absolute value sum $ACC_0$ of the transmission signal with respect to the coded sub-region $RGS_0$ in accordance with the following formula:

$$ACC_0 = \Sigma_{RGS0} |DATA| \tag{38}$$

The absolute value sum $ACC_0$ can be obtained by integrating 256 pieces ($16 \times 16 = 256$) of pixel data combined to form the coded sub-region $RGS_0$. From $ACC_0$, the pixel mean value data MEAN per pixel is obtained by:

$$MEAN_0 = \frac{ACC_0}{16 \times 16} \tag{39}$$

Subsequently, at a step SP113, the data control circuit 31 similarly obtains absolute value sums $ACC_K$ (K=1 through 8) with respect to the 8 adjacent sub-regions $RGS_K$ (K=1 through 8). In each such case, $ACC_K$ is expressed as:

$$ACC_K = \Sigma_{RGSK} |DATA| \quad (K=1 \text{ through } 8) \tag{40}$$

Thereafter, a 1-pixel mean value $MEAN_K$ (K=1 through 8) is given by the following formula:

$$MEAN_K = \frac{ACC_K}{16 \times 16} \tag{41}$$

Then at a step SP114, the data control circuit 31 calculates a maximum value difference DIFF between the absolute value sum $ACC_0$ of the coded sub-region $RGS_0$ and the absolute values of the 8 adjacent sub-regions $RGS_K$ (K=1 through 8) as the arithmetic result of the below:

$$DIFF = MAX\{ |ACC_0 - ACC_K| \}(K=1 \text{ through } 8) \tag{42}$$

Among the variations both in the significant picture information quantity, that is, the absolute value sum $ACC_0$, of the coded sub-region $RGS_0$ and in the significant picture information quantities of the adjacent sub-regions $RGS_K$ (K−1 through 8) surrounding the coded sub-region, the data control circuit 31 is operative, at the steps SP112–SP114, to recognize the steepest variation as a characteristic of the picture of the significant picture information of the coded sub-region $RGS_0$. Based on a magnitude of the maximum value difference DIFF, the data control circuit 31 subsequently executes an arithmetic operation for determining the quantization step STEPG.

More particularly, at steps SP115 and SP116, the data control circuit 31 sequentially judges whether or not the difference DIFF is greater than or equal to first and second picture information estimation reference values EST1 and EST2 which, in the present example, are set as follows:

$$EST1 = 10 \tag{43}$$

$$EST2 = 5 \tag{44}$$

The first and second picture information estimation reference values EST1 and EST2 are selectively set to such values so as to classify intensities of variations in the picture information. Thus, when he answer is affirmative at the step SP115 (that is, DIFF≧10), it is judged that the variations in the coded sub-region $RGS_0$ are the steepest ones. If the answer at step SP115 is negative, and if the answer is affirmative at the step SP116 (that is, 10>DIFF≧5), it is judged that the variations in the picture information of the coded sub-region $RGS_0$ are moderate. Finally, if the answer is negative both at step SP115 and at step SP116, (that is, DIFF<5), it is judged that the variations in the picture information of the coded sub-region $RGS_0$ are small.

Thus, in effect, the data control circuit 31 judges that the picture information drastically changes in the coded sub-region $RGS_0$ when an affirmative answer is obtained at the step SP115 and, in response thereto, moves to a step SP117, where the data control circuit 31 sets the picture variation estimating coefficient data RATIO to a numerical value [0.8], as follows:

$$RATIO = 0.8 \quad (45)$$

The circuit 31 then shifts to a step SP118.

When the answer is YES at the step SP116, the data control circuit 31 comes to the conclusion that the variations in the picture information of the coded sub-region $RGS_0$ are moderate, and moves to a step SP119 in which the picture variation estimating coefficient data RATIO is set to a numerical value [0.9], as follows:

$$RATIO = 0.9 \quad (46)$$

Then the circuit 31 shifts to the step SP118.

When the answer is negative at the step SP116, the data control circuit 31 judges therefrom that the variations in the picture information of the coded sub-region $RGS_0$ are small, and the circuit 31 shifts to a step SP120, wherein the picture variation estimating coefficient data RATIO is set to [1.0], as follows:

$$RATIO = 1.0 \quad (47)$$

Then, the circuit 31 moves to the step SP118.

Thus, the data control circuit 31 is able to set the picture variation estimating coefficient data RATIO so as to represent the amount of variations in the information of the coded sub-region $RGS_0$.

After setting of the picture variation estimating coefficient data RATIO in the step SP117, SP119 or SP120, the data control circuit 31 is operative, in the step SP118, to calculate the buffer remaining quantity index data $STEP_{FB}$, as follows:

$$STEP_{FB} + \frac{\text{Buffer Remaining Quantity}}{\text{Buffer Capacity}} \times 100 \quad (48)$$

Thereafter, at a step SP121, the quantization step STEPG is arithmetically obtained as follows:

$$STEPG = STEP_{FB} \times RATIO \quad (49)$$

As the buffer remaining quantity employed for computing the buffer remaining quantity index data at the step SP118, the data control circuit 31 uses a buffer remaining quantity data signal S25 fed back from the transmission buffer memory 3 (FIG. 6). The quantization step STEPG is obtained by compressively converting a value of the signal S25 by using the picture variation estimating coefficient data RATIO in accordance with the formulas (45) through (47).

After calculating the quantization step STEPG in the foregoing manner, the data control circuit 31 moves to a step SP122 for which a lower limit estimation reference value EST11 is set to a value [4], that is:

$$EST11 = 4 \quad (50)$$

The data control circuit 31 is operative in step SP122 to determine whether or not the quantization step STEPG is smaller than the lower limit estimation reference value EST11. If a negative answer is obtained at the step SP122, the routine proceeds to a step SP123 for which an upper limit estimation reference value EST12 is set to a value [128] as below:

$$EST12 = 128 \quad (51)$$

The data control circuit 31 is operative in the step SP123 to determine whether or not the quantization step STEPG is larger than the upper limit estimation reference value EST12.

The value [4] to which the lower limit estimation reference value EST11 is set is selected to correspond to the value for noises. Therefore, when the pixel data to be quantized is reduced to be as small as noises, there is an affirmative answer at the step SP122 and the data control circuit 31 determines therefrom that the calculated quantization step STEPG has become excessively small, and shifts to step SP124, at which circuit 31 fixes the quantization step STEPG to the lower limit estimation reference value [4]. After the step SP124, the circuit 31 outputs the quantization step STEPG as a quantization step control signal S31 to the quantization circuit 16, and the quantization step calculating procedures are finished at a step SP126.

The value [128], to which the upper limit estimation reference value EST12 is set, is selected to estimate an excessive condition of the quantization step STEPG. Therefore, if the answer is YES at the step SP123, the routine moves to a step SP127 at which the value of the quantization step STEPG is fixed to the upper limit estimation reference value EST12 = 128. Then the quantization step calculating procedures are terminated through the steps SP125 and SP126.

On the other hand, if the answer is negative at the step SP123, this implies that no abnormality can be seen in the quantization step STEPG calculated at the step SP121, that is, the calculated value of the quantization step STEPG is between [4] and [128].

Therefore, in the event of a negative answer at the step SP123, the routine proceeds directly to the step SP125 at which the data control circuit 31 outputs, to the quantization circuit 16, the quantization step STEPG as calculated at the step SP121. The quantization step calculating procedures thereafter come to an end at the step SP126.

By means of the routine shown on FIG. 19, the data control circuit 31 obtains, when coding the coded sub-region $RGS_0$, the maximum value differential data DIFF representing differences between the coded sub-region $RGS_0$ and the adjacent sub-regions $RGS_k$ (K = 1 through 8) at steps SP112 to SP114. Thereafter, at the steps SP115 to SP120, a value of the picture variation estimating coefficient data RATIO is selectively set in accordance with the obtained magnitude of the maximum value differential data DIFF.

In accordance with this embodiment, the following three estimation ranges are established for the maximum value differential data DIFF.

First estimation range is:

$$DIFF \geq 10 \quad (52)$$

Second estimation range is:

$$10 > DIFF \geq 5 \quad (53)$$

Third estimation range is:

$$5 > DIFF \quad (54)$$

When the value of the maximum value differential data DIFF falls within the first, second and third estimation ranges, respectively, the data control circuit 31 allocates values [0.8], [0.9] and [1.0], respectively, as the picture variation estimating coefficient data RATIO, thereby estimating the variation in the significant picture information.

At the steps SP118 and 121, the data control circuit 31 suitably weights the buffer remaining index data $STEP_{FB}$ representing a buffer remaining quantity of the transmission buffer memory 3, and then uses the results of the above mentioned estimation, that is, the RATIO value from the step SP117, SP119 or SP120, for determining the quantizing step STEP G.

In consequence of the foregoing, the picture variation estimation coefficient RATIO diminishes when the quantity of significant picture information increases due to an increase in the value of the maximum value differential data DIFF, and the data control circuit 31 correspondingly acts to reduce the quantization step STEPG.

In case of step variations in the significant picture information quantity of the picture parts in the coded sub-region $RGS_0$, transmission data exhibiting a much higher picture quality can be generated by reducing the quantization step STEPG of the coded sub-region $RGS_0$.

Therefore, in the embodiment of the invention shown in FIG. 19, the circuit 31 is made to reduce the value of the quantization step STEPG with respect to the picture parts in which the significant picture information drastically changes. In many cases, these parts may be boundaries between relatively simple picture regions and relatively complicated picture regions. Hence, the picture parts exhibiting the drastic changes can be quantized to provide clear picture data. This leads to a further enhancement of the picture quality of the transmission data as a whole.

More particularly, the picture parts showing drastic changes are quantized by finer quantization steps. As a matter of fact, the quantization can be carried out to provide a picture in which two picture parts showing drastic changes are smoothly connected, in the visual sense, at the boundary therebetween. Further, noises, such as mosquito noises, can be prevented.

Moreover, in the embodiment of FIG. 19, steps SP122, SP123, SP124 and SP127 cause the data control circuit 31 to restrict the range within which the quantization step STEP G can be adjusted. This avoids occurrence of an overflow or underflow in the transmission buffer memory 3.

The embodiment discussed above with reference to FIG. 19 concerns a case where the buffer remaining quantity index data $STEP_{FB}$ is compressed by being multiplied by the picture variation estimating coefficient data RATIO used for indicating the variations in the significant picture information. However, this invention is not limited to that specific arrangement. Thus, the arithmetic operation on $STEP_{FB}$ for obtaining the quantization step STEPG at the step SP121, can involve the addition and subtraction to and from $STEP_{FB}$ of data representing the amount of variations of the significant picture data.

Further, in the embodiment of FIG. 19, the maximum value of differences between the coded sub-region and the adjacent sub-regions are used as the data for indicating the information quantity of the picture on the basis of the absolute value sum of the pixel data DATA. However, instead of the absolute value sum, the power of the video signals may be used. Further, instead of the maximum value of the differences between the coded and adjacent sub-regions, a dynamic range of such differences may be used.

Where the transform coding circuit 15 involves the use of a discrete cosine transform circuit, a discrete cosine transform coefficient may be detected as a significant picture information quantity.

When obtaining the buffer remaining quantity index data $STEP_{FB}$ at the step SP118 of FIG. 19, the remaining quantity given from the transmission buffer memory 3 is used, as in the prior art arrangement of FIG. 4. However, in place of the foregoing, the remaining quantity data may be generated within the data control circuit 31 on the basis of the transmission data information S33 from the motion detecting circuit 21.

In step SP114 of the routine shown in FIG. 19, among the differences in the absolute value sum, the difference of the maximum value is employed as the data or parameter representing the variations in the significant picture information between the coded sub-region and the adjacent sub-regions. However, such parameter is not thus limited but may involve the use of, for instance, a ratio of the absolute value sum of the pixel signals in the coded sub-region $RGS_0$ to the maximum value differential data DIFF. In other words, any parameter indicating the degree of variations in the significant picture information may be employed.

Moreover, values other than the maximum value of the differential data $|ACC_0-ACC_K|$ can also be used as the parameter representing the variations in the significant picture information between the coded and adjacent sub-regions.

In step SP114 of the routine shown in FIG. 19 the differences between the coded sub-region $RGS_0$ and all eight of the adjacent sub-regions $RGS_K$ (K=1 through 8) which surround the coded sub-region (FIG. 17) are considered. However, the difference between the coded sub-region $RGS_0$ and a part of the adjacent sub-regions, for example, the adjacent sub-region $RGS_R$ disposed just before the coded sub-region (FIG. 20) may also be used.

In the embodiment of the invention described with reference to FIG. 19, each of the sub-regions $RGS_K$ is selectively set to correspond with a transmission unit block (a region of 16 pixels×16 pixels). However, the area of each of the sub-regions $RGS_K$ is not limited to the transmission unit block, and may be varied therefrom as the necessity arises.

By way of summary, it is to be noted that, in the embodiment of FIG. 19 and the modifications thereof discussed above, the quantization step STEPG is controlled so as to vary in accordance with an amount of variations in the picture information between the subregion to be quantized and the adjacent sub-regions. It is therefore possible to generate transmission data so as to enhance the picture qualities of the picture parts in which the quantity of picture information changes drastically. Thus, it is feasible to smoothly connect picture parts in which the picture information changes drastically. Moreover, transmission data adapted to effectively restrain the occurrence of noises can be generated.

Figure 21A:
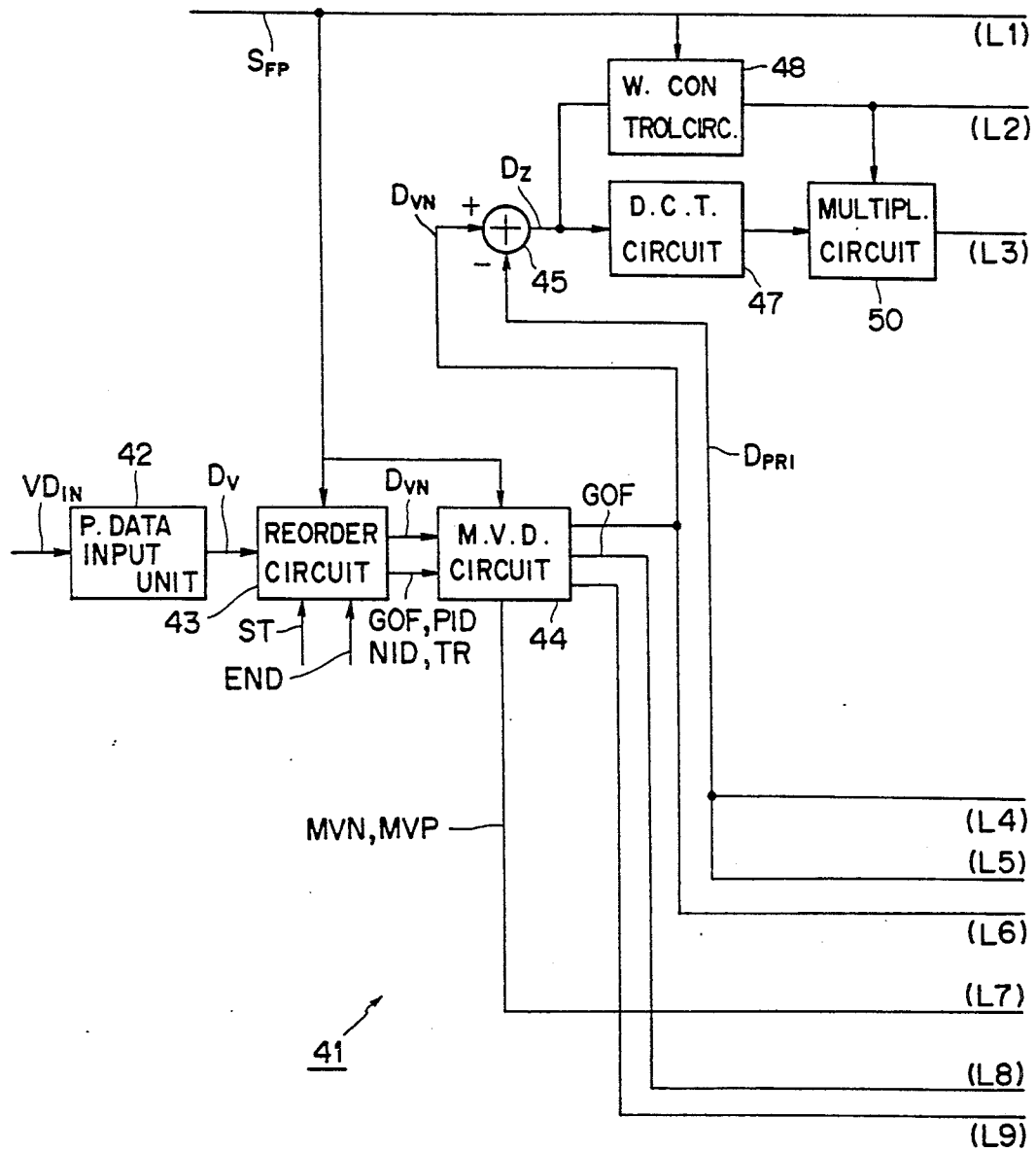
FIGS. 21A and 21B are block diagrams showing the overall arrangement of a video signal transmission system according to a fifth embodiment of the present invention.
Figure 21B:
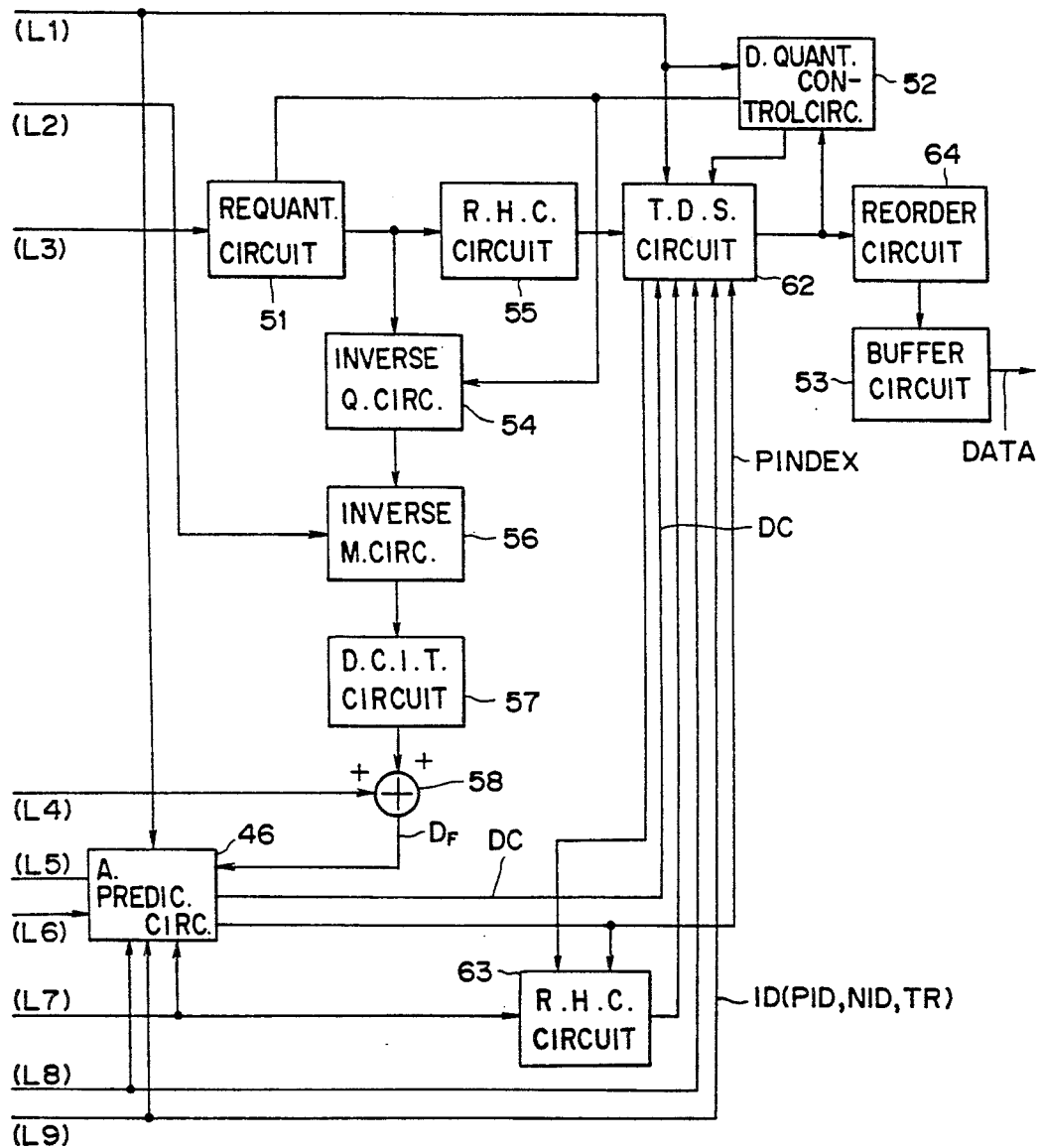

Referring now to FIG. 21, it will be seen that, in a video signal recording system 41 to which still another embodiment of the present invention is applied, an input video signal $VD_{IN}$ is highly-efficiently-coded and transformed into transmission frame data DATA for recording on, for example, a compact disc.

In the video signal recording system 41, the input video signal $VD_{IN}$ is applied to a picture data input unit 42, wherein the luminance and chrominance signals constituting the input video signal $VD_{IN}$ are transformed into digital data. Subsequently, the quantity of data is compressed to one-fourth its original amount.

More specifically, in the picture data input unit 42, the luminance signals which have been transformed into digital data are applied to a one-side field removing circuit (not illustrated) in which one field of each frame is removed and, thereafter, the luminance signals for the remaining field of each frame are culled out in alternate lines.

The picture data input unit 42 further removes, for one field of each frame, the two color difference signals which have been transformed into digital signals, and then the unit 42 alternately outputs one or the other of the color difference or chrominance signals at each line. The culled-out luminance signals and the alternately outputted chrominance signals are transformed into data having a predetermined transmission rate in a time-base transform circuit.

Thus, the input video signal $VD_{IN}$ undergoes preprocessing in the picture data input unit 42 which transforms the same into sequentially generated picture data $D_V$ comprised of a series of frame data.

When start pulse signals ST are inputted to a reorder circuit 43, the latter reorders the picture data $D_V$ as follows:

The picture data $D_V$ comprised of pieces of frame data that are to be inputted in the order of A0, C1, C2, B3, C4, C5, A6, C7, . . . are, after being divided into frame groups, each made up of 6-frames, reordered in a coding sequence, for example, the sequence A0, A6, B3, C1, C2, C4, C5, A12, B9, C7, . . . The thus reordered data $D_{VN}$ are then outputted.

It is to be noted that, in the foregoing, frames to be intra-frame-coded are symbolized by the letter A with numerals, while the frames to be inter-frame-coded at a level 1 or 2 are symbolized by the letters B or C, respectively, with numerals.

The frame data are thus reordered in the coding sequence, whereby the sequential intra- and inter-frame-coding processes can be correspondingly simplified.

The reorder circuit is made operative, at the first transmission of an end pulse signal END, to reorder the frame data inputted just prior to such signal END. The reorder circuit 43 then stops outputting the reordered frame data $D_{VN}$. Simultaneously, the circuit 43 outputs a frame group index GOF in which a signal level rises at the top of each frame group, a pre-predictor reference index PID, a post-predictor reference index NID and a temporary index TR indicating the order of the frame data in the frame groups.

A motion vector detecting circuit 44 receives the data $D_{VN}$ and processes the individual frame data by dividing the frame data into predetermined macro-unit blocks.

At this time, the motion vector detecting circuit 44 delays, by a predetermined period of time, the frame data A0, A6, A12, . . . which are to be intra-frame-coded. The same frame data arranged in the macro unit blocks are outputted to a subtractor circuit 45. In contrast, with respect to the frame data B3, C1, C2, C4, C5, . . . , which are to be inter-frame-coded, the circuit 44 detects motion vectors MVP and MVN on the basis of the frame data of predetermined predicted frames of each macro unit block.

The motion vector detecting circuit 44 performs macro unit block basis transmissions, with a delay equivalent to a motion vector detecting time, of the frame group index GOF, the pre-predictor reference index PID, the post-predictor reference index NID and the temporary index TR together with the reordered picture data $D_{VN}$.

The subtractor circuit 45 subtracts from the picture data $D_{VN}$ prediction data $D_{PRI}$ outputted from an adaptive prediction circuit 46 and provides deviation data $D_Z$ as a result of such subtraction. The deviation data $D_Z$ is supplied from the subtractor circuit 45 to a discrete cosine transform circuit 47 and a weighting control circuit 48.

The adaptive prediction circuit 46 outputs, when executing intra-frame-coding, a mean value of the picture data of each pixel as the prediction data $D_{PRI}$ for a macro unit block. When executing inter-frame-coding, the adaptive prediction circuit 46 executes a selective predicting process for selecting a pre-prediction, a post-prediction and an interpolative prediction. Thereafter, the circuit 46 outputs the frame data of a selected predicted result as the prediction frame data $D_{PRI}$ for a macro unit block.

With this arrangement, it is possible to obtain, from the subtractor circuit 45, the deviation data $D_Z$ relative to the frame data which are inter-frame-coded. Moreover, a mean value of the deviation data $D_Z$ can also be obtained with respect to the frame data which are intra-frame-coded.

The discrete cosine transform circuit 47 cosine-transforms the deviation data $D_Z$ for a macro unit block by making use of a DCT method. The circuit 47 then transmits the output data thereof to a multiplication circuit 50 which effects a predetermined weighting of the output data of the discrete cosine transform circuit 47 in accordance with control data generated by the weighting control circuit 48 on the basis of the deviation data $D_Z$. The circuit 50 subsequently sends the weighted output data to a requantization circuit 51.

The requantization circuit 51 requantizes the output data of the multiplication circuit 50 by using a quantization step STEPG which is switch-controlled in accordance with control data outputted from a data quantity control circuit 52 on the basis of a buffer remaining quantity in a buffer circuit 53. The circuit 51 then transmits the requantized output data to an inverse requantization circuit 54 and to a run-length Huffman coding circuit 55.

The inverse requantization circuit 54 executes a requantizing process, inverse to that in the requantization circuit 51, on the output data from the requantization circuit 51, thereby reproducing the data inputted to the requantization circuit 51. Such reproduced data from the circuit 54 is supplied to an inverse multiplication circuit 56.

The inverse multiplication circuit 56 performs a multiplying process, inverse to that performed in the multiplication circuit 50 controlled by the weighting control circuit 48, on the output data of the inverse requantization circuit 54. The circuit 56 thereby reproduces the data inputted to the multiplication circuit 50, and such reproduced data is supplied to a discrete cosine inverse transform circuit 57.

The discrete cosine inverse transform circuit 57 effects a transform process, which is the inverse to the discrete cosine transform process effected in circuit 47, on the output data of the inverse multiplication circuit 56. In consequence, the data inputted to the discrete cosine transform circuit 47, that is, the deviation data $D_Z$, is reproduced by the circuit 57 and transmitted therefrom to a subsequent adder circuit 58.

The adder circuit 58 adds the prediction data $D_{PRI}$ from the adaptive prediction circuit 46 to the output data of the discrete cosine inverse transform circuit 57, and the resulting added output data $D_i$ is supplied to a respective input of the adaptive prediction circuit 46.

Such output data $D_F$ obtained by the adaptive prediction circuit 46 from the adder circuit 58 are frame data $D_F$ formed by reproducing the data inputted to the subtractor circuit 45. Consequently, the circuit 46 sets predicted frames by selectively taking in the frame data $D_F$. Subsequently, there is acquired a selective predictive result associated with the frame data $D_{VN}$ inputted to the subtractor circuit 45.

The frame data are inputted after being reordered according to an internal processing sequence. In the adaptive prediction circuit 46, the selective predicted result may therefore be detected by sequentially selectively taking in the frame data $D_F$. The video signals can be transmitted with a correspondingly simpler construction.

The run-length Huffman coding circuit 55 effects a Huffman coding process, which is a variable-length coding process, on the output data of the requantization circuit 51. The circuit 55 transits the resulting Huffman-coded data to a transmission data synthesizing circuit 62.

Similarly, a second run-length Huffman coding circuit 63 Huffman-codes the motion vectors MVN and MVP from the motion vector detecting circuit 44 and transmits the thus coded vectors to a respective input of the transmission data synthesizing circuit 62.

Synchronizing frame pulse signals $S_{FP}$ are applied to the circuits 43, 44, 46, 48, 52 and 62, and the transmission data synthesizing circuit 62 outputs, synchronously with such frame pulse signals $S_{FP}$, the output data of the first and second runlength Huffman coding circuits 55 and 63, a predictor index PINDEX from the circuit 46, the pre-predictor reference index PID, the post-predictor reference index NID and the temporary index TR originating from the circuit 43, together with the control information from the data quantity control circuit 52, all in a predetermined order.

At this time, the transmission data synthesizing circuit 52 disposes headers for each macro unit block, block unit group, frame data and frame group. Added to the headers are the data, such as, the predictor index PINDEX, as a consequence of which the transmission data are decoded at the reproducing device in accordance with the data to the headers.

A reorder circuit 64 reorders the output data from the transmission data synthesizing circuit 62 in the sequence of effecting the coding process in each frame group. The circuit 64 outputs the reordered data to the buffer circuit 53 from which the transmission frame data DATA are sequentially outputted.

Thus, it is feasible to obtain transmission frame data DATA in which the input video signals $VD_{IN}$ are highly-efficiently-coded. The transmission frame data DATA may be recorded together with the synchronizing signals or the like on a compact disc to effectively prevent the deterioration of the picture quality. Hence, motion video signals can be recorded with a high density.

Figure 22:
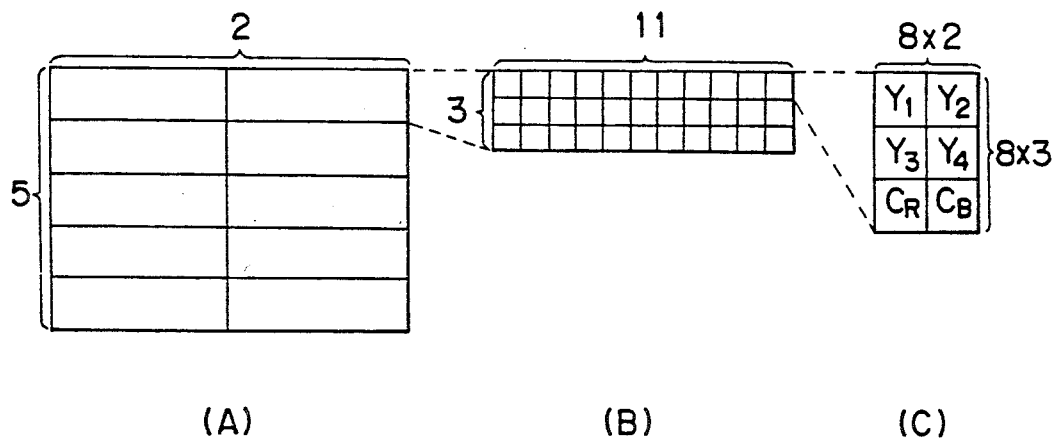
FIG. 22 is a schematic diagram to which reference will be made in explaining how frame data is divided in the system of FIG. 21.

It is to be noted that, in the embodiment of FIG. 21, the individual frame data (FIG. 22A) undergoes 5×2 divisions in the vertical and horizontal directions, respectively, on a display screen, that is, the frame data is divided into a total of 10 block unit groups.

Each of the block unit groups (FIG. 22B) is further subjected to 3×11 divisions in the vertical and horizontal directions, respectively, that is, each block unit group is divided into 33 macro unit groups. The process is carried out on the basis of the macro unit group.

By way of example, the single macro unit group is arranged such that picture data for 8 pixels is allocated to each block, that is, the data are allocated to a total of six blocks arrayed vertically and horizontally (FIG. 22C).

For these six blocks, luminance signals $Y_1$, $Y_2$, $Y_3$ and $Y_4$ are allocated to 2×2 blocks, that is, a total of 4 blocks arrayed vertically and horizontally, and chrominance signals $C_R$ and $C_B$ corresponding to the luminance signals $Y_1$, $Y_2$, $Y_3$ and $Y_4$ are allocated to the two remaining blocks.

Figure 24:
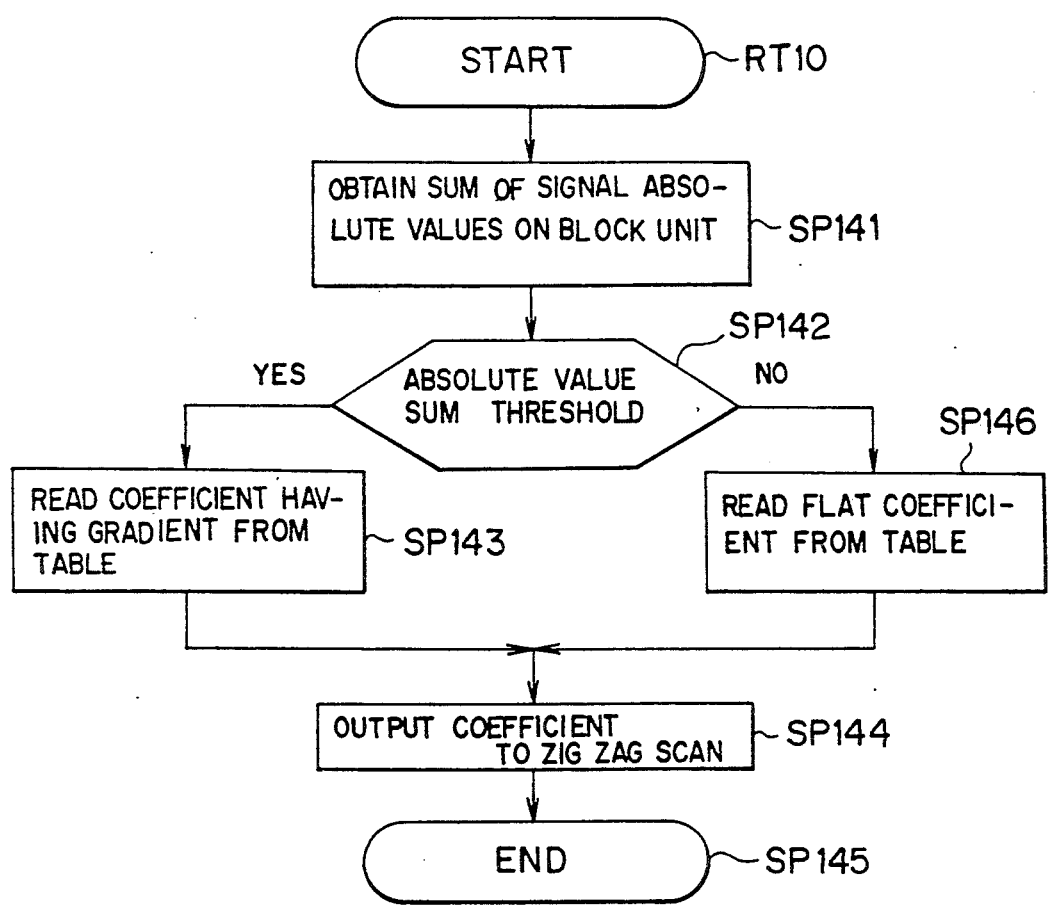

In the video signal recording system 41, the weighting control circuit 48 is desirably composed of a microcomputer including a ROM (Read Only Memory). The weighting control circuit 48 executes, in synchronism with the frame pulses $S_{FP}$, a threshold setting program RT0 (FIG. 23) and a weighting coefficient setting program RT10 (FIG. 24) for each frame and each block in the respective frame.

The circuit 48 thus determines the weighting by the multiplication circuit 50 of the output data of the discrete cosine transform circuit 47.

The weighting control circuit 48 is constructed to provide a subjectively improved picture quality by adjusting the weighting coefficient itself to the nature of the picture.

More specifically, in accordance with a known principle, in a region including much information of a displayed picture, reduced weight may be given to an oblique component of the high frequency components exhibiting the lowest spectral luminous efficacy, without deterioration of the picture being readily apparent because of masking by other components. Based on this principle, the weighting function is selectively applied in connection with the region in which a masking effect is expected, that is, where there exists a good deal of picture information.

Further, based on the principle given above, the weighting control circuit 48 at first enters the threshold setting program RT0 for each frame of the deviation data $D_Z$, in synchronism with the frame pulses $S_{FP}$. At the next step SP131, the circuit 48 obtains a total sum $W_{ALL}$ of the absolute values of the deviation data $D_Z$ for each region BLK which, in this case corresponds to the macro unit block, inputted from the subtractor circuit 45 with respect to one entire frame.

In the next step SP132, the weighting control circuit 48 divides the total sum $W_{ALL}$ by the number of blocks contained in one frame, thus obtaining a mean value of the absolute value sum of the deviation data $D_Z$ for each block BLK. At the following step SP133, a threshold level $W_{th}$ is detected by increasing the mean value by a factor n (n=1.5 in this example). The threshold setting program RT0 comes to an end at a step SP134.

The weighting control circuit 48 enters the weighting coefficient setting program RT10 for each block BLK of the deviation data $D_Z$. At the next step SP141, the circuit 48 calculates an absolute value sum $W_{BLK}$ of the deviation data $D_Z$ for each block BLK inputted from the subtractor circuit 45.

Subsequently, at a step SP142, the weighting control circuit 48 judges whether or not the obtained absolute value sum $W_{BLK}$ for a block BLK is greater than the threshold level $W_{th}$ set by the threshold setting program RT0. If a YES answer is obtained at the step SP142, which implies that the relevant block BLK is a region having a large quantity of information $W_{BLK}$, the operation moves to a subsequent step SP143.

Figures 25, 26:
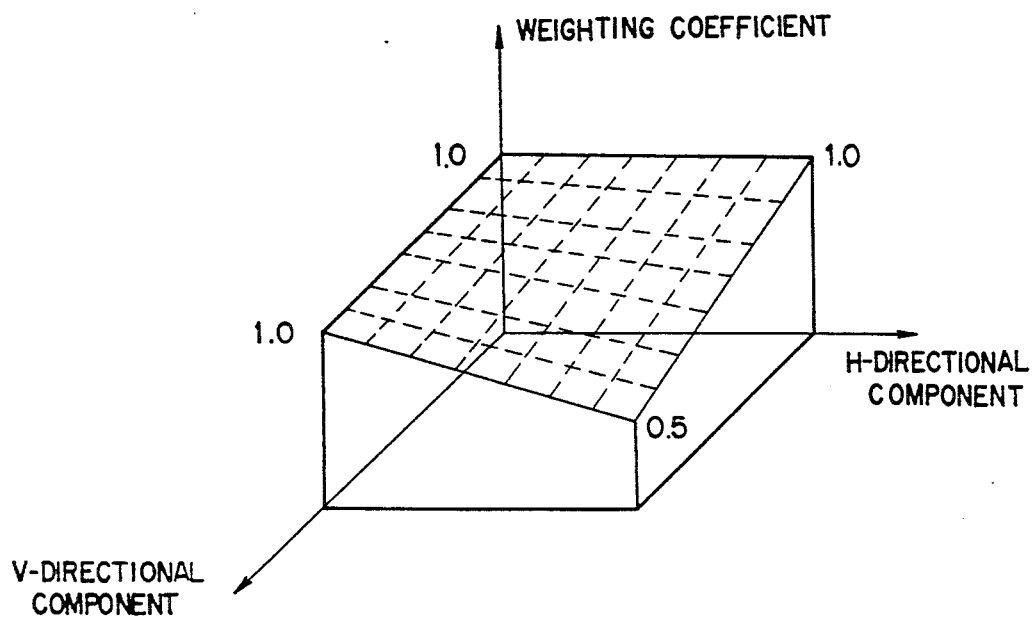
FIG. 25 is a schematic diagram to which reference will be made in explaining the development of a weighting coefficient.
FIG. 26 is a table of weighting coefficients.

At the step 143, a horizontal component H and a vertical component V (FIG. 25) of the high frequency components are preserved. Read from the ROM in the circuit 48 is a coefficient table (FIG. 26) containing weighting coefficients each having a gradient to sequentially reduce the oblique components, whereupon, the operation shifts to the next step SP144.

On the other hand, if a NO answer is obtained at the step SP142, which implies that the relevant block BLK is a region having a small quantity of information, the program proceeds to a step SP146 in which the weighting control circuit 48 reads from the ROM a coefficient table containing flat weighting coefficients, for example, each consisting of a value [1], whereupon the operation then proceeds to the step SP144.

At the step SP144, the coefficient table read from the ROM at the step SP143 or SP146 is subjected to zig-zag scanning in accordance with the DCT method, and then is transmitted as control data to the multiplication circuit 50. The weighting coefficient setting program RT10 is terminated at the next step SP145.

Careful attention is thus paid to the information quantity $W_{BLK}$ of each block BLK. The weighting coefficient having a gradient is determined with respect to the block BLK having the information quantity $W_{BLK}$ greater than the threshold level $W_{th}$ based on the mean value per block BLK. The mean value is, in turn, obtained from the total information quantity $W_{ALL}$ of the frames. Therefore, it is possible to effectively prevent fading of a picture, for example, in a region thereof having a small quantity of information and containing a good deal of high frequency components of the spatial frequency.

As a result of the described arrangement, the weighting coefficient works effectively with respect to the block having a large amount of information. Hence, it is feasible to make the quantization step STEPG of the high frequency component of the spatial frequency larger than the quantization step STEPG of the low frequency component of the spatial frequency. The video signals can be transmitted with a high efficiency by effectively preventing deterioration of the picture quality without incrementing the data quantity.

The weighting coefficient exhibiting a flat characteristic is provided for each block BLK having a small information quantity $W_{BLK}$. Deterioration of the picture quality can be prevented because the high frequency components of the spatial frequency can be preserved. Thus, a video signal recording system capable of improving the compression efficiency of the picture data can be attained while preventing deterioration of the picture quality.

In the embodiment of the invention described above with reference to FIGS. 21-26, the weighting coefficients having gradients or flat characteristics are all held in the form of a table in a ROM of the weighting control circuit 48. However, in a modification of that embodiment, a constant value, for example, a value [1], may be generated and supplied to the multiplication circuit 50 in connection with any block BLK having an information quantity $W_{BLK}$ less than the threshold level $W_{th}$.

Further, in the embodiment described with reference to FIGS. 21-26, weighting coefficients having gradients or flat characteristics are selectively supplied to the multiplication circuit 50 on the basis of a comparison between the block unit information quantity $W_{BLK}$ and the threshold level $W_{th}$ based on the mean value per block BLK which is obtained from the total information quantity $W_{ALL}$. Instead, of the foregoing, weighting coefficients having gradient characteristics may be supplied to the multiplication circuit 50 with respect to any block BLK having an information quantity $W_{BLK}$ greater than the threshold level $W_{th}$, whereas, the multiplication circuit 50 is simply by-passed for any block having an information quantity $W_{BLK}$ smaller than the threshold level $W_{th}$.

Furthermore, in the embodiment described with reference to FIGS. 21-26, the information quantity is obtained from the absolute value sum of the deviation data $D_Z$. However, the described advantages of the invention can be achieved by making use of the power or an absolute value sum of the DCT coefficient and the power of the deviation data based on Parseval's theorem.

In the embodiment of the invention described with reference to FIGS. 21-26, the block BLK has been employed as the comparative region. However, various other regions may be used in the discrete cosine transform circuit on condition that the DCT processing unit is applicable thereto.

Moreover, although, in the embodiment of FIGS. 21-26, the weighting coefficient is multiplied in the multiplication circuit with respect to the output data which is discrete-cosine-transformed by the discrete cosine transform circuit and transmitted therefrom, the same advantages can be realized by an arrangement in which the discrete cosine transform circuit itself contains the weighting coefficients.

Although the invention has been described with reference to FIG. 21 as applied to the video signal recording system 41 for transmitting the picture data after being discrete-cosine-transformed, this invention is also applicable to other video signal recording systems for transmitting the picture data after being, for instance, Fourier-transformed, or for transmitting the picture data after time components of the picture data have been transformed into frequency components.

Although it has been mentioned that the video signal recording system 41 embodying this invention is for recording the picture data on a compact disc, the invention is not limited to such system and may be broadly applied to any video signal transmission system for transmitting digital video signals after being highly-efficiently-coded.

Having specifically described various preferred embodiments of this invention and certain modifications thereof, it is to be understood that the invention is not limited to those embodiments and described modifications, and that various changes and further modifications may be effected therein by a person skilled in the art without departing from the scope or spirit of the invention as defined in the appended claims.

What is claimed is:

1. A method for compressing a frame of video data to be transmitted, comprising:
   discrete cosine transform coding said frame of video data to provide discrete cosine transform coded video data;
   quantizing said discrete cosine transform coded video data with a quantizing step of variable size to provide quantized video data;
   variable length coding said quantized video data to provide a variable length code; and
   controlling the size of said quantizing step by accumulating a first total absolute value of said frame of video data, dividing said frame of video data into a plurality of subregions thereof, accumulating a second total absolute value of each said sub-region of video data, distributing a total bit amount allowed for transmission of said first total absolute value to a bit amount allowed for transmission of each said subregion in proportion to said second total absolute value, and determining said size of the quantization step in response to said bit amount allowed for transmission of the respective region so that said size of the quantizing step is controlled in response to at least one characteristic of said frame of video data which influences the quality of a respective picture displayed therefrom.

2. The method according to claim 1; in which said first total absolute value is obtained from a present frame which is to be transmitted.

3. The method according to claim 1; in which said first total absolute value is obtained from a frame preceding a frame which is to be transmitted.

4. A method for compressing a frame of video data to be transmitted, comprising:
   discrete cosine transform coding said frame of video data to provide a discrete cosine transform coded video data;
   quantizing said discrete cosine transform coded video data with a quantizing step of variable size to provide quantized video data;
   variable length coding said quantized video data to provide a variable length code;
   controlling said size of the quantizing step in response to at least one characteristic of said frame of video data which influences the quality of a respective picture displayed therefrom;
   dividing each said frame of video data into a plurality of sub-regions each containing a predetermined number of pixels and corresponding to a transmission unit block;
   accumulating a total absolute value of transmission data for each said transmission unit block;
   determining from said total absolute value of transmission data a mean value thereof for each said pixel;
   further controlling said size of the quantizing step on the basis of said mean value;
   transmitting said variable length code through a transmission buffer memory having a predetermined buffer capacity;
   determining the remaining quantity of said buffer capacity;
   calculating a size of the quantizing step from a product of said mean value of transmission data and a ratio of said remaining quantity to said buffer capacity; and
   substituting predetermined minimum and maximum values of said quantizing steps in the event that the calculated size of the quantizing step is below or above, respectively, said minimum and maximum values.

5. A method for compressing a frame of video data to be transmitted, comprising:
   discrete cosine transform coding said frame of video data to provide a discrete cosine transform coded video data;
   quantizing said discrete cosine transform coded video data with a quantizing step of variable size to provide quantized video data;
   variable length coding said quantized video data to provide a variable length code;
   transmitting said variable length code through a transmission buffer memory having a predetermined buffer capacity;
   determining the quantity of said buffer capacity remaining in said buffer memory;
   detecting motion in a picture from successive frames of said video data; and
   controlling the size of said quantizing step in accordance with said motion in a picture that is detected and with said remaining quantity of said buffer capacity.

6. The method for compressing a frame of video data to be transmitted, comprising:
   discrete cosine transform coding said frame of video data to provide a discrete cosine transform coded video data;
   quantizing said discrete cosine transform coded video data with a quantizing step of variable size to provide quantized video data;
   variable length coding said quantized video data to provide a variable length code;
   transmitting said variable length code through a transmission buffer memory having a predetermined buffer capacity;
   determining the quantity of said buffer capacity remaining in said buffer memory;
   dividing each said frame of video data into a plurality of sub-regions each containing a predetermined number of pixels of data to be coded;
   generating a feed back quantization step of the basis of said remaining quantity of buffer capacity;
   comparing said data of each of said pixels with said feedback quantization step for detecting motion in a picture; and
   controlling the size of said quantizing step in accordance with said motion in a picture that is detected and with said remaining quantity of said buffer capacity.

7. The method according to claim 6; in which, when said comparing of said data of each pixel with said feedback quantization step indicates the presence of motion, said controlling of the size of said quantizing step for a sub-region being coded is effected on the basis of comparing data in successive frames from sub-regions which are adjacent the coded sub-region.

8. The method according to claim 7; in which said adjacent sub-regions are respectively differently displaced horizontally and vertically in respect to said coded sub-region; and in which, in comparing data in successive frames from said differently displaced sub-regions, the results thereof have differently weighted values in said controlling of said size of the quantizing step.

9. The method according to claim 8; in which said controlling of the size of said quantizing step further includes adding said differently weighted values of the results to provide a sum of said values, detecting motion in said coded sub-region, determining a feedback quantization step transform ratio on the basis of the detection of motion in said coded sub-region and said sum of the differently weighted values, and obtaining said size of the quantizing step from said feedback quantization step and said feedback quantization step transform ratio.

10. The method according to claim 8; in which said controlling of the size of said quantizing step further includes adding said differently weighted values of the results to provide a sum of said values, detecting differences between motions occurring at said coded sub-region and said adjacent sub-regions, determining a feedback quantization step transform ratio on the basis of detected differences between motions occurring at said coded and adjacent sub-regions, respectively, and said sum of the differently weighted values, and obtaining said size of the quantizing step from said feedback quantization step and said feedback quantization step transform ratio.

11. A method for compressing a frame of video data to be transmitted, comprising:
discrete cosine transform coding said frame of video data to provide discrete cosine transform coded video data;
quantizing said discrete cosine transform coded video data with a quantizing step of variable size to provide quantized video data;
variable length coding said quantized video data to provide a variable length code;
transmitting said variable length code through a transmission buffer memory having a predetermined buffer capacity;
determining the quantity of said buffer capacity remaining in said buffer memory;
generating a feedback quantization step on the basis of the proportion of said remaining buffer capacity to said predetermined buffer capacity;
dividing each said frame of video data into a plurality of sub-regions each containing a predetermined number of pixels of data to be coded; and
controlling of the size of said quantizing step by determining a mean value for said pixels in one of said sub-regions to be coded, determining a mean value for said pixels in each of a plurality of said sub-regions surrounding said one-sub region to be coded, determining a maximum difference between said mean value associated with said sub-region to be coded and said mean values associated with said surrounding sub-regions, selecting a feedback quantization step transform ratio in accordance with the amount of said maximum difference, and calculating said size of the quantizing step from said feedback quantization step and said feedback quantization step transform ratio.

12. The method according to claim 11; further comprising substituting predetermined minimum and maximum values of said quantizing step in the event that the calculated size of the quantizing step is below or above, respectively, said minimum and maximum values.

13. A method for compressing a frame of video data to be transmitted, comprising:
discrete cosine transform coding said frame of video data to provide discrete cosine transform coded video data;
quantizing said discrete cosine transform coded video data with a quantizing step of variable size to provide quantized video data;
variable length coding said quantized video data to provide a variable length code;
controlling said size of the quantizing step in response to at least one characteristic of said frame of video data which influences the quality of a respective picture displayed therefrom;
dividing each said frame of video data into a plurality of blocks;
generating predictive data for each of said blocks;
providing deviation data as the difference between the video data and predictive data for each of said blocks;
accumulating a first total absolute value of said deviation data for each said frame;
dividing said first total absolute value by the number of said blocks in a frame so as to obtain a mean value of the absolute value of said deviation data for each said block;
setting a threshold level in accordance with said mean value;
calculating a second total absolute value of said deviation data for each of said blocks;
determining whether or not said second total absolute value is greater than said threshold level;
applying to said discrete cosine transform coded data a weighting coefficient having a gradient when said second total absolute value is greater than said threshold level; and
applying to said discrete cosine transform coded data a flat weighting coefficient when said second total absolute value is less than said threshold value.

* * * * *